US008671209B2

(12) United States Patent
Awano

(10) Patent No.: US 8,671,209 B2
(45) Date of Patent: Mar. 11, 2014

(54) MOBILE TERMINAL MANAGEMENT SYSTEM, NETWORK DEVICE, AND MOBILE TERMINAL OPERATION CONTROL METHOD USED FOR THEM

(75) Inventor: Jun Awano, Tokyo (JP)

(73) Assignee: NEC Corporation, Tokyo (JP)

(*) Notice: Subject to any disclaimer, the term of this patent is extended or adjusted under 35 U.S.C. 154(b) by 1162 days.

(21) Appl. No.: 12/526,989

(22) PCT Filed: Feb. 12, 2008

(86) PCT No.: PCT/JP2008/052236
§ 371 (c)(1),
(2), (4) Date: Aug. 13, 2009

(87) PCT Pub. No.: WO2008/099802
PCT Pub. Date: Aug. 21, 2008

(65) Prior Publication Data
US 2010/0017528 A1 Jan. 21, 2010

(30) Foreign Application Priority Data
Feb. 13, 2007 (JP) ................................ 2007-031508

(51) Int. Cl.
G06F 15/16 (2006.01)
(52) U.S. Cl.
USPC .......................................... 709/230; 709/225
(58) Field of Classification Search
USPC .................................... 709/230, 225
See application file for complete search history.

(56) References Cited

U.S. PATENT DOCUMENTS

| 6,829,226 | B1 | | 12/2004 | Apostolides et al. | |
|---|---|---|---|---|---|
| 7,152,238 | B1 | | 12/2006 | Leung et al. | |
| 8,170,529 | B1 | * | 5/2012 | Breau et al. | 455/411 |
| 8,189,544 | B2 | * | 5/2012 | McCann et al. | 370/338 |
| 2004/0205211 | A1 | * | 10/2004 | Takeda et al. | 709/230 |
| 2005/0083885 | A1 | * | 4/2005 | Ikeda et al. | 370/331 |
| 2007/0208855 | A1 | * | 9/2007 | Yegani et al. | 709/225 |
| 2007/0297377 | A1 | * | 12/2007 | McCann et al. | 370/338 |
| 2009/0119412 | A1 | * | 5/2009 | Ala-Vannesluoma et al. | 709/238 |
| 2009/0147789 | A1 | * | 6/2009 | Ng et al. | 370/392 |
| 2009/0193253 | A1 | * | 7/2009 | Falk et al. | 713/171 |

(Continued)

FOREIGN PATENT DOCUMENTS

JP 2005160053 A 6/2005
JP 2006166456 A 6/2006

(Continued)

OTHER PUBLICATIONS

International Search Report for PCT/JP2008/052236 mailed May 1, 2008.

(Continued)

Primary Examiner — Oleg Survillo

(57) ABSTRACT

The object of the present invention is to provide a mobile terminal management system in which a mobile terminal can rapidly decide a PMIP operation or CMIP operation in accordance with the policy of a network administrator. According to the present invention, a network notifies a mobile terminal whether or not the mobile terminal is operable with the PMIP function. Moreover, the mobile terminal of the present invention transmits, to the network, notification saying that a use request for CMIP function has been stored in accordance with the policy of a terminal side, such as user setting or service contents, upon connection or hand-over to the access network.

12 Claims, 10 Drawing Sheets

(56) References Cited

U.S. PATENT DOCUMENTS

| | | | |
|---|---|---|---|
| 2009/0274062 A1* | 11/2009 | Yan et al. | 370/254 |
| 2009/0313680 A1* | 12/2009 | Hirano | 726/3 |
| 2010/0011426 A1* | 1/2010 | Falk et al. | 726/7 |
| 2010/0074179 A1* | 3/2010 | Akiyoshi | 370/328 |

FOREIGN PATENT DOCUMENTS

| | | |
|---|---|---|
| TW | 346712 | 12/1998 |
| TW | 200414707 | 8/2004 |
| WO | 2005125118 A | 12/2005 |

OTHER PUBLICATIONS

"WiMAX End-to-End Network Systems Architecture (Stage 2: Architecture Tenets, Reference Model and Reference Points) [Part2]". WiMAX Forum Proprietary, Apr. 14, 2006 DRAFT.

K. Leung et al., "Mobility Management using Proxy Mobile IPv4", MIP4, Internet-Draft Jun. 25, 2006, [online] <http://www.ietf.org/internet-drafts/draft-leung-mip4-proxy-mode-01.txt>.

S. Gundavelli., et al, "Proxy Mobile IPv6", MIP6 WG, Internet-Draft, Oct. 16, 2006, [online] <http://www.ietf.org/internet-draft/draft-sgundave-mipv6-poxymipv6-00.txt>.

K. Chowdhury et al., "Network Based Layer 3 Connectivity and Mobility Management for IPv6", Network Working Group, Internet-Draft, Sep. 8, 2006, [online] <http://www.ietf.org/internet-drafts/draft-chowdhury-netmip6-01.txt>.

S. Gundavelli et al., "Proxy Mobile IPv6", IETF NETLMM WG, Internet-Draft, Jan. 5, 2007, [online] <http://www.watersprings.org/pub/id/draft-sgundave-mip6-proxymip6-01.txt>.

European search report for EP08711100.1 dated Aug. 28, 2012.

Damic D et al: "Proxy Mobile IPv6 indication and discovery; draft-damic-netlmm-pmip6-ind-discover-02.txt", Internet Engineering Task Force (IETF), Nov. 19, 2007.

Taiwanese Office Action for TW098114963 dated Sep. 20, 2012.

\* cited by examiner

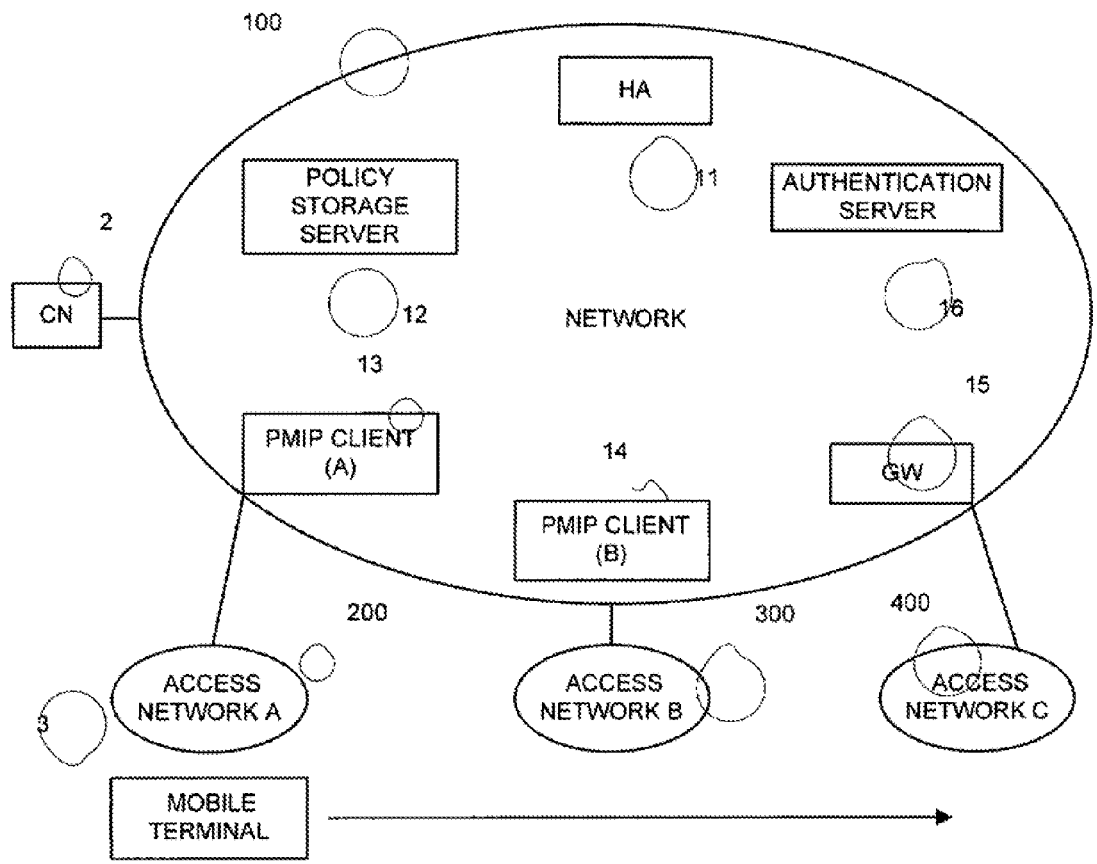

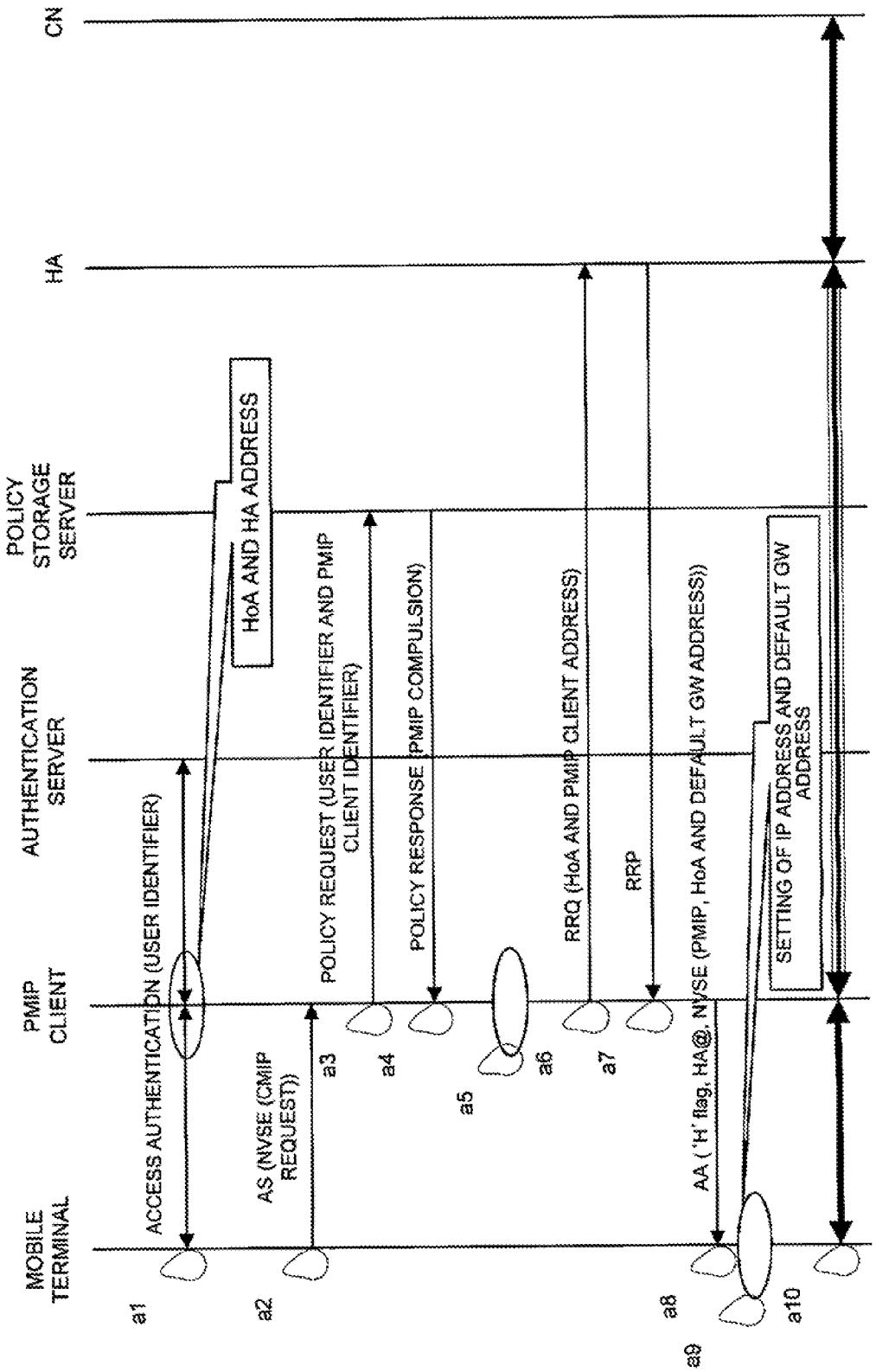

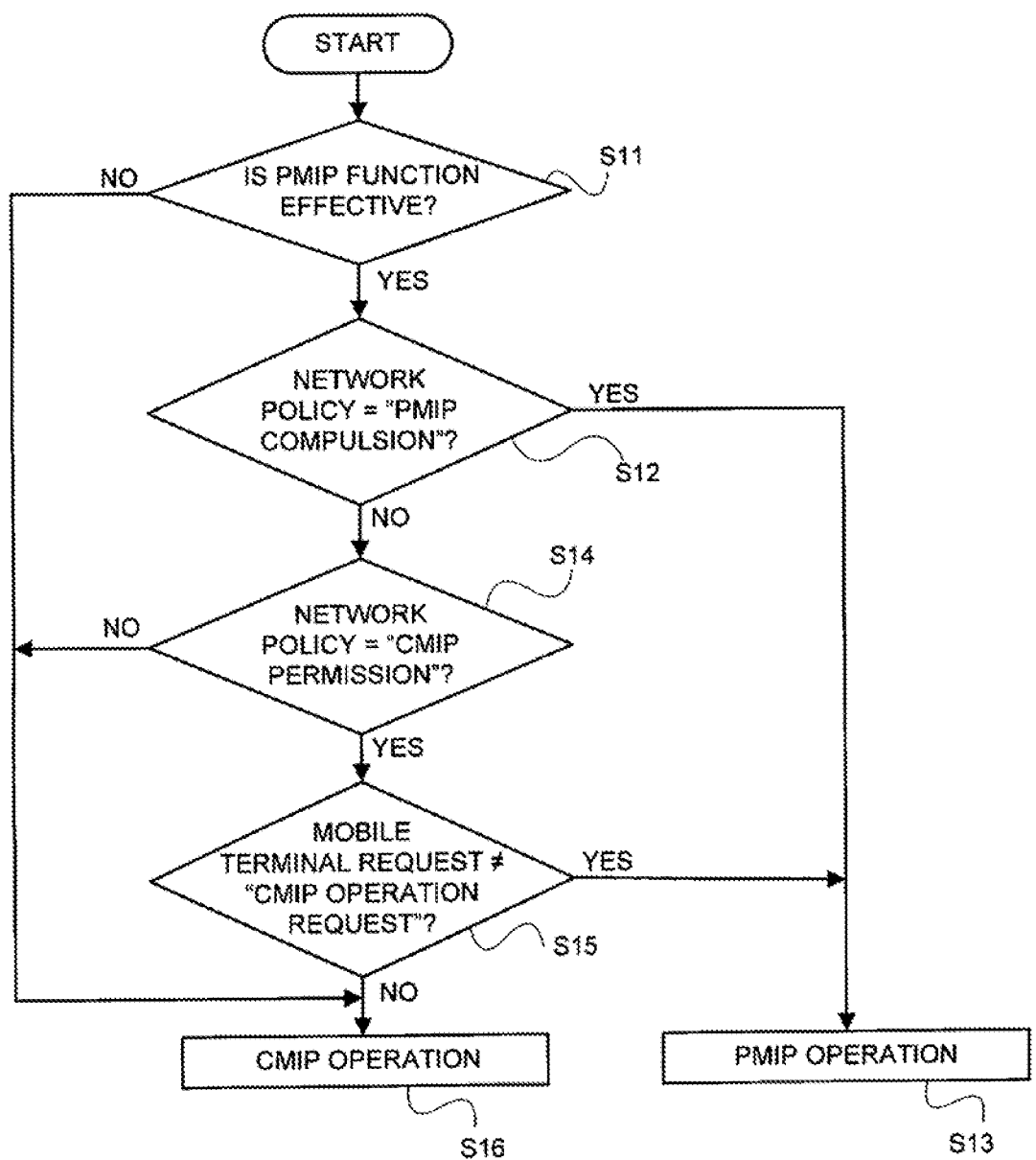

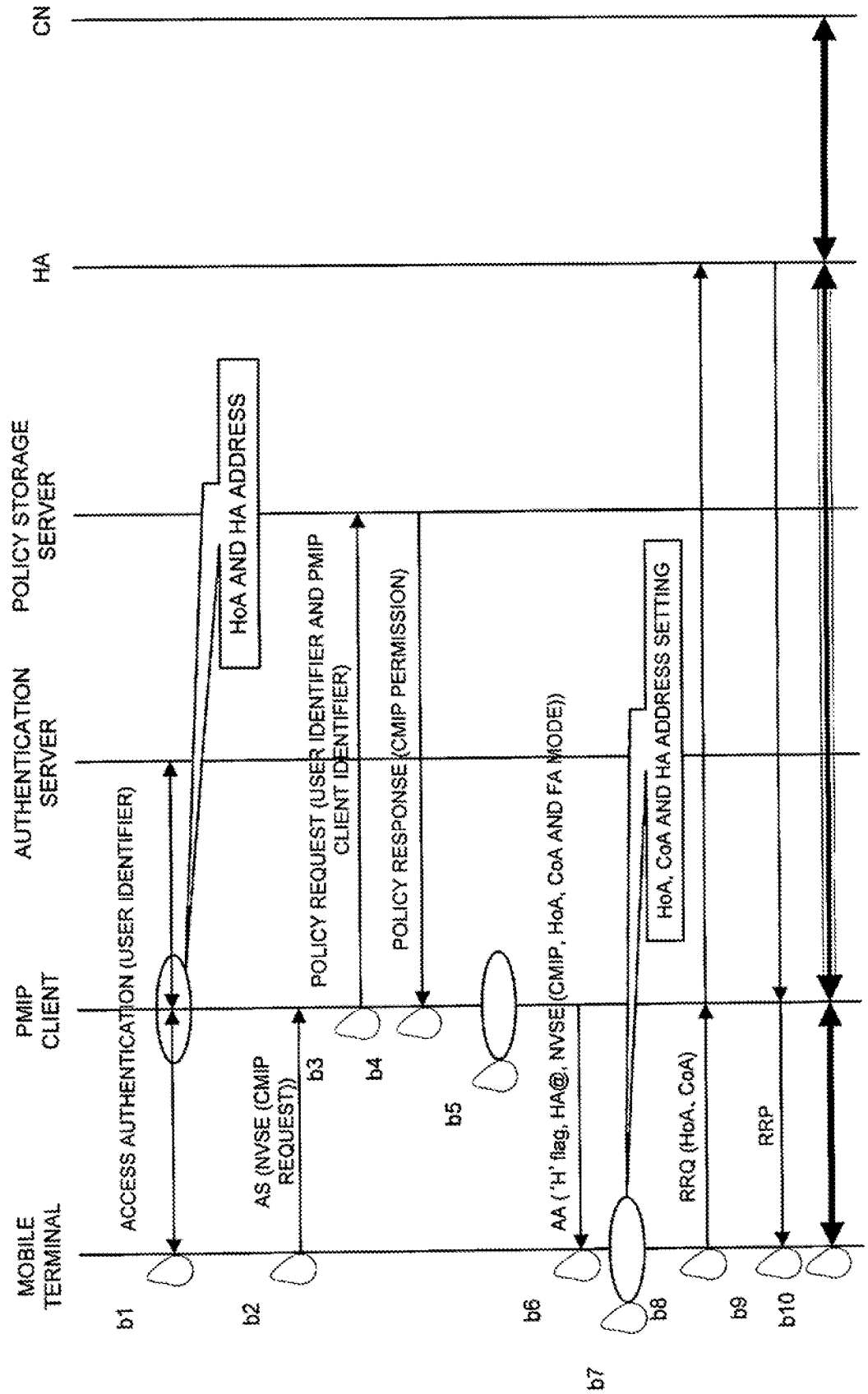

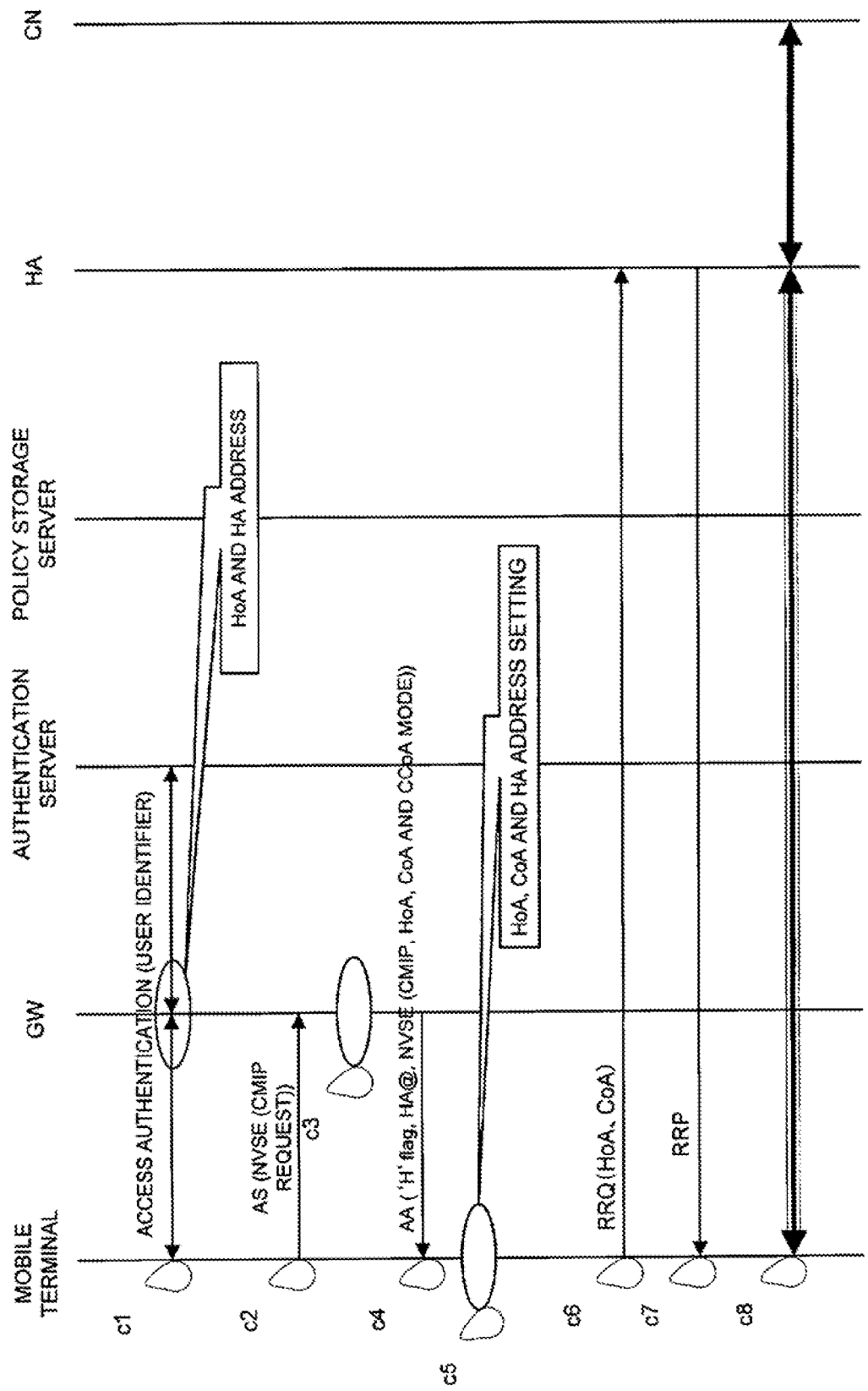

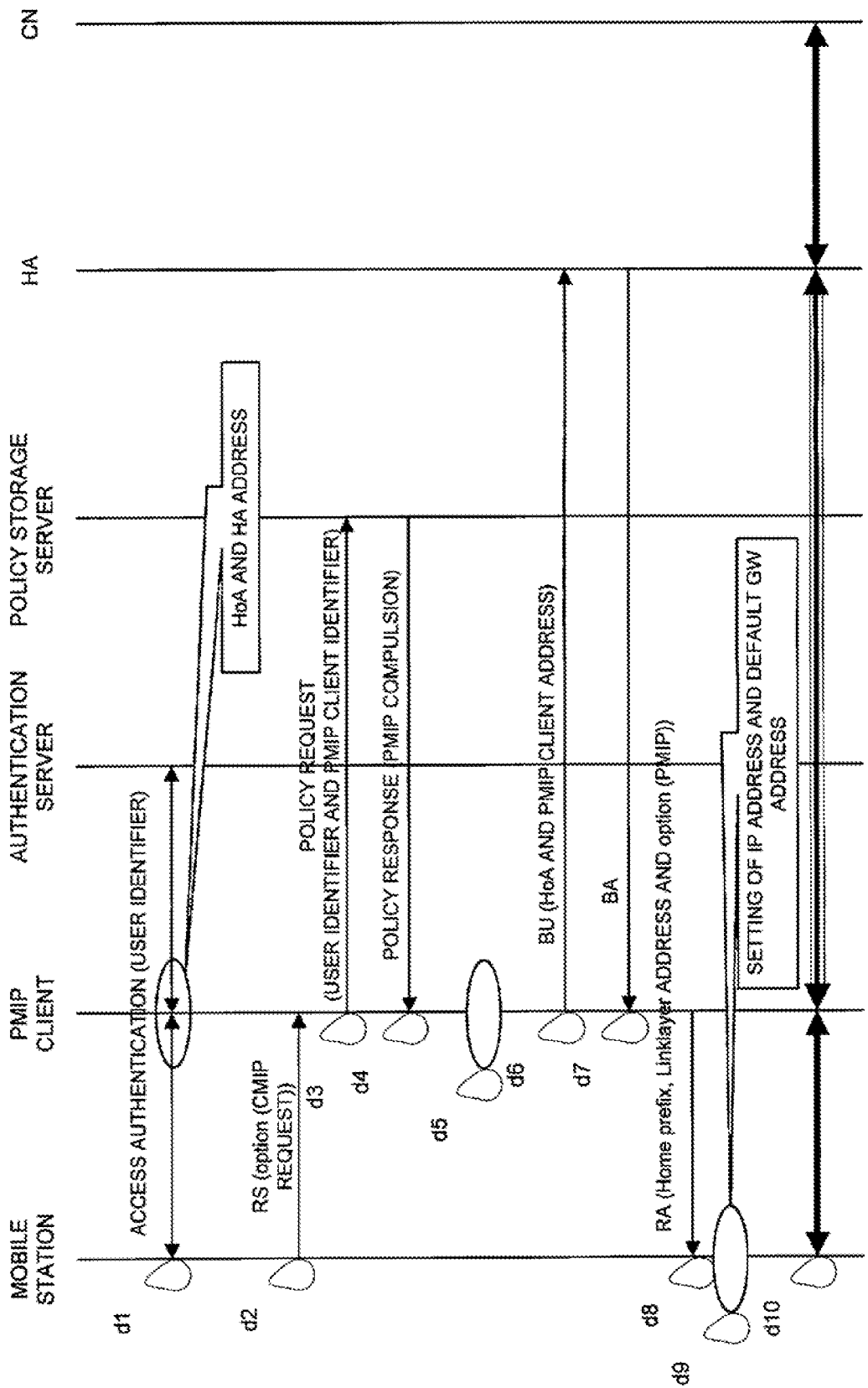

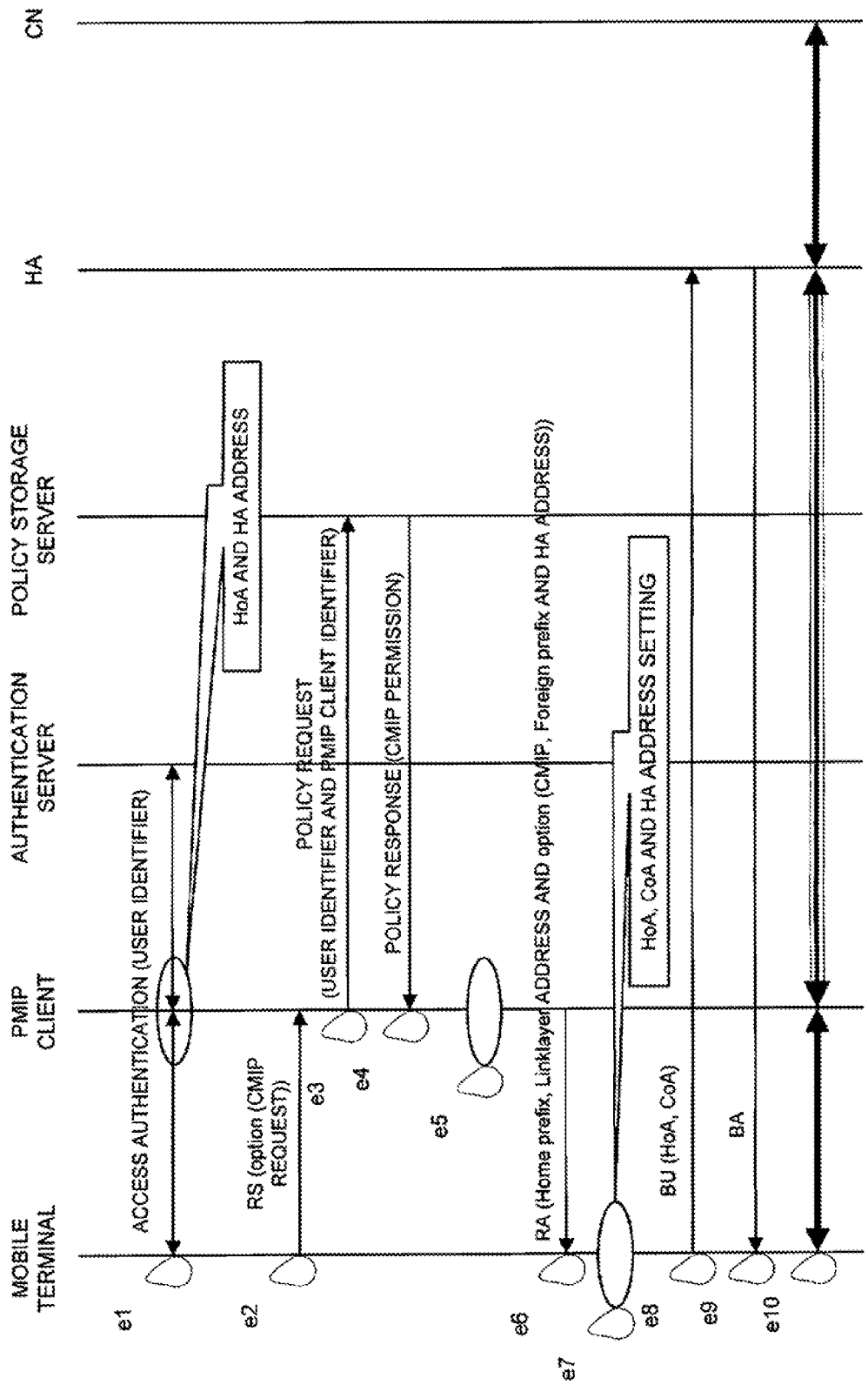

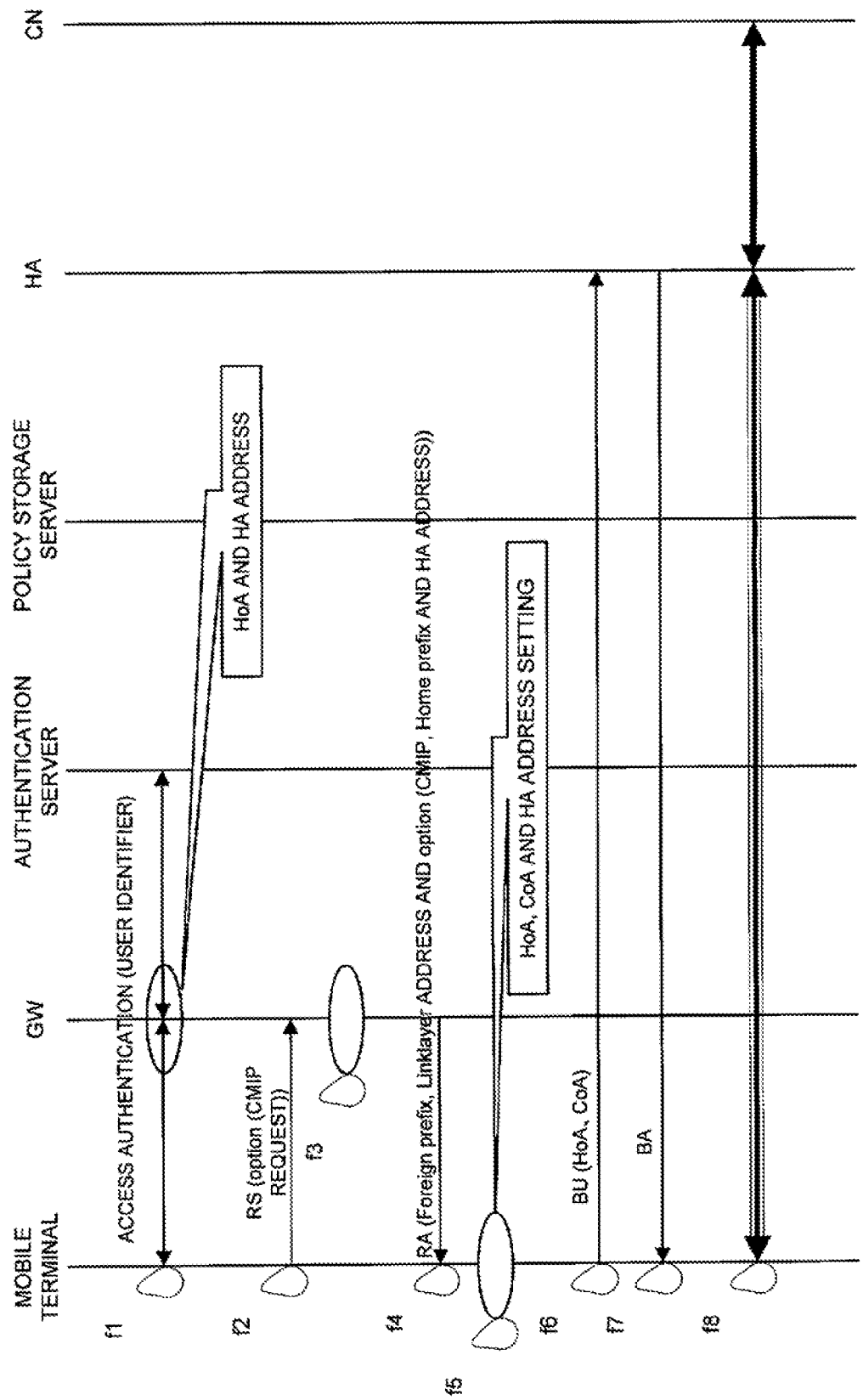

MOBILE TERMINAL MANAGEMENT SYSTEM, NETWORK DEVICE, AND MOBILE TERMINAL OPERATION CONTROL METHOD USED FOR THEM

The present application is the National Phase of PCT/JP2008/052236, filed Feb. 12, 2008, which claims the priority rights based on Japanese Patent application No. 2007-031508 filed on Feb. 13, 2007 and the entire of the disclosure is incorporated here.

TECHNICAL FIELD

The present invention relates to a mobile terminal management system, a network device, and a mobile terminal operation control method used for them. Particularly, the present invention relates to controlling the operational of mobile terminals in a network in which PMIP (Proxy MIP (Mobile Internet Protocol)) clients are deployed.

BACKGROUND OF THE RELATED ART

An operational example of a mobile terminal provided with the CMIP (Client MIP) function (or MIPv4 (Mobile Internet Protocol version 4) function), connected to a network including PMIP clients, is shown below.

That is, with a mobile terminal connected to a network including a PMIP client, the method is considered of transmitting AA (Agent Advertisement) defined in MIPv4 (RFC (Request For Comments) 3344) to a mobile terminal and confirming whether or not the mobile terminal has a CMIP function (for example, refer to non-patent document 1).

That is to say, when a CMIP terminal receives AA, it transmits a RRQ (Registration Request: position registration request) in response to the reception. However, when the RRQ is transmitted, the network side judges that the mobile terminal has a CMIP function and the mobile terminal operates in accordance with the CMIP function.

A Simple IP (Internet Protocol) terminal cannot understand AA and tries to acquire an address in accordance with a DHCP (Dynamic Host Configuration Protocol), like a conventional IP terminal connected to a network. Instead of the Simple IP terminal, the PMIP client transmits a position registration request to HA (Home Agent), with the DHCP request as a trigger.

In the above processing operation, the CMIP terminal performs a CMIP operation exclusively. However, some operators for network administration may desire to operate the CMIP terminal with the PMIP.

However, when the CMIP terminal is connected to a network having the PMIP function, the mechanism for choosing the (PMIP or CMIP) operation of a mobile terminal, in consideration of a request from a mobile terminal side or the policy of a network, does not exist currently.

Non-patent document 1: "WiMAX End-to-End Network Systems Architecture (Stage 2: Architecture Tenets, Reference Model and Reference Points) (Part 2), 7.8 CSN Anchored Mobility Management"

Non-patent document 2: "Mobility Management using Proxy Mobile IPv4", http://www.ietf.org/internet-drafts/draft-le-ung-mip4-proxy-mode-01.txt Non-patent document 3: "Proxy Mobile IPv6", http://www.ietf.org/internet-drafts/draft-sgundave-mipv6-proxymipv6-00.txt Non-patent document 4: "Network Based Layer 3 Connectivity and Mobility Management for IPv6", http//www.ietf.org/internet-drafts/draft-chowdhury-netmip6-0.1.txt

DISCLOSURE OF THE INVENTION

Problems to be Solved by the Invention

The operation in the case where a mobile terminal having the MIP function (MIPv4 function) is connected to a network including a PMIP client is as follows. That is, in accordance with a mobile terminal transmitting a position registration request (RRQ) in response to AA transmitted from the mobile terminal or ignoring AA and acquiring an address in accordance with DHCP, the presence or absence of the MIP function of the mobile terminal is decided. If the mobile terminal does not have the MIP function, a PMIP client, in place of the mobile terminal, transmits RRQ. If the mobile terminal has the MIP function, the mobile terminal itself transmits RRQ through the CMIP operation while the PMIP client does not substitute for the mobile terminal.

According to the processing operation, the CMIP terminal performs a CMIP operation exclusively. Some network control operators may want to operate the CMIP terminal with PMIP. However, the mechanism does not exist that the network side freely controls whether or not the CMIP terminal performs a PMIP operation, without using MIP function, or whether or not a CMIP operation using the MIP function.

In order to solve the above-mentioned problems, an object of the present invention is to provide a mobile terminal management system and a network device, each in which a mobile terminal can rapidly decide a PMIP operation or CMIP operation in accordance with the policy of a network administrator. Moreover, an object of the present invention is to provide a mobile terminal operation control method, used for the mobile terminal management system and the network device.

Means to Solve the Problems

According to the present invention, a mobile terminal management system controls the operation of a mobile terminal in a network, the network including a network device having a PMIP (Proxy MIP (Mobile Internet Protocol)) function. The network notifies the mobile terminal whether or not the mobile terminal is operable with the PMIP function.

According to the present invention, a network device configuring of a mobile terminal management system controls the operation of a mobile terminal in a network, the network including a network device having a PMIP (Proxy MIP (Mobile Internet Protocol)) function. The network device notifies the mobile terminal of a delivery of the PMIP function.

According to the present invention, a mobile terminal operation control method is used for a mobile terminal management system, the mobile terminal management system controlling the operation of a mobile terminal in a network, the network including a network device having a PMIP (Proxy MIP (Mobile Internet Protocol)) function. The network notifies the mobile terminal of a delivery of the PMIP function.

EFFECT OF THE INVENTION

The configuration and operation of the present invention, mentioned above, produces the effect that a mobile terminal can rapidly decide a PMIP operation or CMIP operation in accordance with the policy of a network administrator.

BRIEF DESCRIPTION OF THE DRAWINGS)

FIG. 1 is a block diagram illustrating the configuration of a mobile terminal management system according to a first embodiment of the present invention.

FIG. 2 is a diagram illustrating a format of NVSE.

FIG. 7 is a sequence chart showing the PMIP operation of the mobile terminal 3 in accordance with a network policy, in the first embodiment of the present invention.

FIG. 8 is a flowchart showing a procedure of deciding the operation of the mobile terminal 3 in accordance with a request from the mobile terminal 3 and the policy of a network, in the first embodiment of the present invention.

FIG. 9 is a sequence chart showing a CMIP operation permitted in accordance with a network policy when the mobile terminal 3 is connected to the access network (A)200, in the first embodiment of the present invention.

FIG. 10 is a sequence chart showing the operation of the mobile terminal 3 connected to the access network (C)400, in the first embodiment of the present invention.

FIG. 11 is a sequence chart showing the operation of a mobile terminal management system, according to a second embodiment of the present invention.

FIG. 12 is a sequence chart showing the CMIP operation permitted in accordance with a network policy when the mobile terminal 3 is connected to the access network (A)200, according to the second embodiment of the present invention.

FIG. 13 is a sequence chart showing the operation when the mobile terminal 3 is connected to the access network (C)400, according to the second embodiment of the present invention.

EXPLANATION OF SYMBOLS

Figure 3:
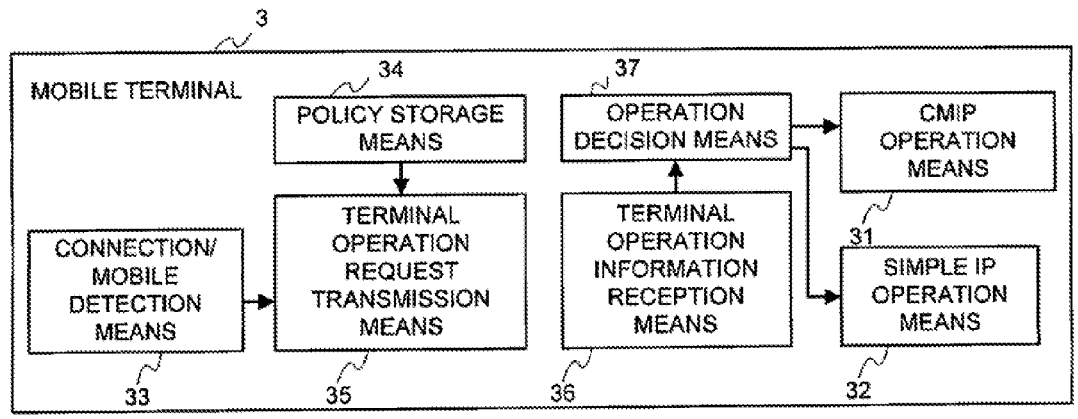
FIG. 3 is a block diagram illustrating the configuration of the mobile terminal shown in FIG. 1.

2 CN
3 Mobile terminal
11 HA
12 Policy storage server
13 PMIP client (A)
14 PMIP client (B)
15 GW
31 CMIP operation means
32 Simple IP operation means
33 Connection/mobile detection means
34 Policy storage means
35 Terminal operation request transmission means
36 Terminal operation information reception means
37 Operation decision means
100 Network
131 PMIP operation means
132 FA operation means
133 Terminal operation request reception means
134 Policy communication means
135 Operation decision means
136 Authentication processing means
137 Terminal operation information transmission means
151 GW operation means
152 FA operation means
153 Terminal operation request reception means
154 Authentication processing means
155 Terminal operation information transmission means 200 Access network (A)
300 Access network (B)
400 Access network (C)

BEST MODE FOR CARRYING OUT THE INVENTION

In a mobile terminal management system of the present invention, when a mobile terminal has a MIP (Mobile Internet Protocol) function (hereinafter emphasizing, as Client MIP (CMIP), being a MIP function on a Client side to PMIP (Proxy MIP)) (hereinafter the mobile terminal is referred to as CMIP terminal) and when the CMIP terminal is connected to a network or performs hand-over, the CMIP terminal has the function of requiring a network device for notification of CMIP capability and the use of CMIP function.

The network notifies the CMIP terminal of a notification that has stored information for controlling the operation of the CMIP terminal and IP (Internet Protocol) setting information, based on the policy of the network administrator. By doing so, the CMIP terminal that operates as a PMIP terminal (that is, a Simple IP terminal) or a CMIP terminal can be determined clearly.

Moreover, in either case of operating as a PMIP terminal and a CMIP terminal, various IP information (HoA (Home address), CoA (Care-of Address), HA (Home Agent) address) of a mobile terminal) of a mobile terminal can be set at high speeds.

For that reason, a mobile terminal management system according to the present invention can shorten the time period taken for the provision of services, in the network connection or hand-over time. In such a time, a notification of terminal capacity, a request for use of CMIP, and notification of terminal control from a network are implemented through expanding protocols, normally used for MIP or IP terminals. Such protocols include AS (Agent Solicitation) and AA (Agent Advertisement), in the case of MIPv4 (Mobile Internet Protocol version 4), and RS (Router Solicitation) and RA (Router Advertisement), in the case of MIPv6 (Mobile Internet Protocol version 6). Thus, not only terminals, compatible for the present invention, but also general CMIP terminals or Simple IP terminals can accommodate the expanded protocol at the same time. The present invention is applicable easily to the existing systems.

The mobile terminal management system of the present invention can use the communication band effectively, because of a reduced number of notifications between the terminal and the network. In mobile communications, which use the radio communication technology, which is, in most cases, inferior in communication band to the cable communication technique, using the communication band effectively is particularly critical.

With a CMIP terminal with the CMIP function, connected to a network with the PMIP function, the mobile terminal management system of the present invention sends a notification for the CMIP operation in accordance with the policy of the CMIP terminal. According to a CMIP terminal request and a network policy, captured by the network through the notification, the mobile terminal management system issues a notification which can control the CMIP or PMIP operation of the CMIP terminal and issues a notification on information (for example, IP address information) necessary for communications.

As a result, in the mobile terminal management system according to the present invention, when the CMIP terminal is connected to a network or is handed over, it can decide a PMIP operation (using the PMIP function on the side of a network) or a CMIP operation (using its CMIP function) and can completely perform the IP setting. That feature can establish high-speed communications, thus realizing the beginning of comfortable services after a power-on state or an avoidance of service interruption on hand-over or shortened interruption time.

The mobile terminal management system according to the present invention has the following feature (1), (2) and (3). (1) The mobile terminal management system of the present invention minimizes a modification of the existing system by using the existing MIP protocols or general protocols. (2) In the mobile terminal management system of the present invention, even when a CMIP terminal, not supporting the present invention, or a general IP terminal, not having a CMIP function, (hereinafter referred to as a Simple IP terminal) is connected to a network including a PMIP client supporting the present invention, commonality can be established on the signal exchange occurring when those terminals are connected to the network. Thus, a general IP terminal and the CMIP terminal can exist together. The present invention can be easily applied to the existing system or the system already studied. (3) When a MIP terminal supporting the present invention is connected to a network supporting the present invention, the operation mode of PMIP operation or CMIP operation can be selected with the intention of the MIP terminal side if the policy of the network side accepts. By doing so, the terminal side can control the timing of hand-over. Moreover, the terminal can select HA (Home Agent) in accordance with the type of service or can register positions to plural home agents (HA), broadening the width of service delivable to users.

HA corresponds to SAE-A (System Architecture Evolution-Anchor) in 3GPP. 3GPP2, WiMAX Forum is designated as HA, as it is. In 3GPP, 3GPP-A (3GPP-Anchor), MME (Mobility Management Entity)/UPE (user Plane Entity), PDG (Packet Data Gateway) correspond to the PMIP client. In 3GPP2, PDSN (Packet Data Serving Node), PDIF (Packet Data Interworking Function) corresponds to the PMIP client. Moreover, in WiMAX Forum, ASN (Access Service Network)-GW corresponds to the PMIP client.

In succession, the present invention will be explained below in more detail by referring the attached drawings.

FIG. 1 is a block diagram illustrating the configuration of a mobile terminal management system according to a first embodiment of the present invention. Referring to FIG. 1, the mobile terminal management system according to a first embodiment of the present invention includes a network 100, an access network (A)200, an access network (B)300, an access network (C)400, a CN (Correspondent Node) 2, and a mobile terminal 3.

The network 100 includes a HA (Home Agent) 11, a policy storage server 12, a PMIP (Proxy MIP (Mobile Internet Protocol)) client (A)13, a PMIP client (B)14, and a GW (Gateway) 15.

The network 100 is a network managed by a provider that provides various services to the mobile terminal 3. The network 100 corresponds to, for example, a network termed as Core Network in 3GPP (3$^{rd}$ Generation Partnership Project) and corresponds to CSN (Connectivity Service Network) in WiMAX.

A HA 11 is defined in RFC (Request For Comments) 3344 or RFC 3775. The HA 11 transfers packets, encapsulated, for Home Address of a mobile terminal, to a mobile destination of the mobile terminal, in accordance with a position registration request from a CMIP (Client MIP) terminal or PMIP client.

In the present embodiment, the HA 11 has the function equivalent to that of a general HA. Together with the function of transferring packets to a mobile destination of a mobile terminal of HA of MIP, like SAE-A (System Architecture Evolution-Anchor) or 3GPP-A (3GPP-Anchor), for example, in 3GPP, the HA incorporates other functions or may be called as a different name. All nodes incorporating a HA function as MIP are in the category of nodes shown as HA 11.

The policy storage server 12 stores the policy of a network for operating the CMIP terminal as a Simple IP (Internet Protocol) terminal or as a CMIP terminal. The policy storage server 12 sends back the policy of a network to a policy request from the PMIP client (A)13 or the PMIP client (B)14. That policy may be a common policy in network unit or a policy in access network unit. Moreover, the policy may be a policy different in user or mobile terminal unit.

When a policy is applied in access network units, the policy request includes a PMIP client or a identifier of GW. When a policy is applied in user units, the policy request stores a user identifier, such as a user NAI (Network Access Identifier) defined in RFC4282. Similarly, when a policy is applied in mobile terminal units, a policy request stores a terminal identifier.

When the same policy is applied fixedly, the policy storage server 12 can be omitted. In such a case, the operation policy of the CMIP terminal is set to the setting files for the PMIP client (A)13, PMIP client (B)14, and GW 15.

Policy information stored in the policy storage server 12 may be, for example, "PMIP compulsion" forcing the CMIP terminal to operate as PMIP, "CMIP permission" permitting the CMIP terminal to select a PMIP operation or a CMIP operation, and "CMIP compulsion" forcing the CMIP terminal to operate as CMIP. However, the policy information should not be limited only to those examples.

Each of the PMIP client (A)13 and (B)14 has not only the function of a general PMIP client but also the function of deciding the PMIP operation or CMIP operation of the mobile terminal 3 based on the terminal operation request information transferred from the mobile terminal 3 and based on the policy acquired from the policy storage server 12. Thereafter, each PMIP client has the function of transmitting, to the mobile terminal 3, notification including terminal operation control information controlling the operation of the mobile terminal 3 and IP setting information necessary to decide the PMIP operation or CMIP operation by the mobile terminal 3.

The general PMIP function is the function of transmitting a position registration request of CMIP to the HA 11, in place of the mobile terminal 3. The position registration request is a RRQ (Registration Request) in MIPv4 and BU (Binding Update) in MIPv6.

As to the specification of a PMIP client, plural drafts (non-patent documents 2 to 4) having some differences, including a selection of MIPv4 or MIPv6 acting as a base, a decision of accommodation of both terminals for IPv4 and IPv6, a decision of the time when a position registration request is transmitted substitutively, or the like, are presented to IETF (Internet Engineering Task Force).

However, even in either case as described above, the node having the PMIP function, in place of a terminal, transmits a position registration request to the HA 11, is defined. The node having the PMIP function corresponds to the PMIP client (A)13 or (B)14 of the present invention. Even if a new draft is issued later or a formal standard file is made, the node having the PMIP function incorporating elements of the present invention corresponds to the PMIP client of the present embodiment.

In the present embodiment, the PMIP client (A)13 or (B)14 has both the general PMIP function and the function notifying the operation control information of the mobile terminal 3 of the present invention. Those functions may be assembled as another node.

The PMIP client (A)13 is arranged on the boundary between the network 100 and the access network (A)200 and the PMIP client (B)14 is arranged on the boundary between the network 100 and the access network (B)300. The PMIP clients (A)13 and (B)14 may include the authentication function of authenticating a user or the communication I/F (interface). In addition to the above-mentioned functions, the function provision of a node acting as the PMIP client of the present invention depends on the state of embodiment. The function provision should not be limited only to the present embodiment.

The GW 15 is a router arranged on the boundary between the network 100 and the access network (C)400. For communications between the mobile terminal 3 and a node in the network 100, the GW 15 may include the authentication function for performing user authentication or communication I/F authentication. In addition to the function for working as the general router or authentication GW, the GW 15 of the present invention has the function of transmitting terminal operation control information, such as the operation of the mobile terminal 3 acting as CMIP, to the mobile terminal 3 and transmitting notification including IP setting information necessary for the CMIP operation of the mobile terminal 3 to the mobile terminal 3.

When each of the PMIP client (A)13 and (B)14 and the GW 15 notifies the mobile terminal 3 of terminal operation control information and IP setting information, the present invention relates to the method in which each of MIPv4 and MIPv6 expands a generally used protocol and then stores information.

In specific explanation, MIPv4 stores information into AA (Agent Advertisement) while MIPv6 stores information into RA (Router Advertisement). In such a case, it is not necessarily to use general protocols such as AA and RA. However, using AA and RA can provide the following advantages. That is, (1) transmitting a new notification, other than AA or RA, is not required and the communication band can be used effectively. (2) In addition to the CMIP terminal supporting the present invention, the general CMIP terminal and Simple IP terminal can be accommodated consistently. (3) By devising information added to a general information factor, which can be stored in AA or RA, even the CMIP terminal, not supporting the present invention, can control the CMIP operation and PMIP operation, although the efficiency or degree of freedom is poor, compared with the CMIP terminal supporting the present invention.

When AA or RA of MIPv4 is transmitted to plural mobile terminals within the same link, the IP setting information of a specific terminal cannot be included. However, in the network studied in 3GPP or 3GPP2 and WiMAX Forum, assumed as a preferable application of the present invention, the PMIP client or GW is connected to a mobile terminal via an individual link in mobile terminal units. Accordingly, AA or RA is transmitted to a specific mobile terminal. AA or RA including the IP setting information of a specific mobile terminal presents no problem.

Even when the present invention is applied to an ordinary network, AA or RA including IP setting information may be transmitted with Unicast in response to AS or RS transmitted by the specific mobile terminal. Anyway, the present embodiment assumes the situation where AA or RA is transmitted to a specific mobile terminal. However, when the operation control information of a mobile terminal, not the IP setting information, is stored, the present embodiment can be applied to the situation where AA or RA is transmitted to plural mobile terminals.

The authentication server 16 is a general authentication server such as RADIUS or DIAMETER. With the mobile terminal 3 connected to the access network (A)200, the access network (B)300 and the access network (C)400, the authentication server 16 has the function of authenticating the user of the mobile terminal 3 or the mobile terminal 3 itself, in response to respective authentication requests sent from the PMIP client (A)13, the PMIP client (B)14, and GW 15, and thus sending the results back.

When authentication is passed, the PMIP client (A)13, PMIP client (B)14, and GW 15 can down-load, from the authentication server 16, key information, which are used upon performing a position registration request to HoA (Home Address), HA address, or HA, to be allocated to the mobile terminal 3. The general authentication server can realize those functions, using the RADIUS or DIAMETER. Detail explanation of those functions will be omitted here.

In that example, the HA 11, the policy storage server 12, the authentication server 16 are arranged in the network 100 but may be arranged in a different network. For example, the mobile terminal 3 of a subscriber enjoying services from the administrator of the network 100 is connected to a network managed by another administrator, the HA 11 and the authentication server 16 in the network 100 may be used and the policy storage server in an existing area may be used.

The CN 2 is a terminal or server, being a communication opposite party of the mobile terminal 3. The terminal, being a communication opposite party of the mobile terminal 3, may have the function equivalent to that of the mobile terminal 3.

The mobile terminal 3 has the general function of MIPv4 or MIPv6. The mobile terminal 3 further has the function of transmitting, to the network, notification saying that a use request for CMIP function has been stored in accordance with the policy of a terminal side, such as user setting or service contents, upon connection or hand-over to the access network.

Moreover, the mobile terminal 3 has the function of reading terminal operation control information and IP setting information, stored in AA or RA by the PMIP client (A)13, the PMIP client (B)14, or the GW 15. The mobile terminal 3 further has the function of deciding a PMIP operation or CMIP operation according to the terminal operation control information. Moreover, the mobile terminal 3 has the function of performing its IP setting in accordance with the read IP setting information.

The access network (A)200, (B)300 or (C)400 is a network through which the mobile terminal 3 communicates with a node in the network 100. The access network may have the configuration that can connect to the PMIP clients (A)13 and (B)14 and GW 15 via the same L2 (Layer 2) link (that is, the configuration having no intermediate router) or may have the configuration having an intermediate router.

For the terminal operation request information and the terminal operation control information, to be stored into AS and AA of MIPv4, respectively, an example is shown below of using VSE (Vendor/Organization Specific Extension) defined by RFC3115.

VSE can be used when vendor or information inherent in organization is stored. Moreover, CVSE (Critical Vendor/Organization Specific Extension) and NVSE (Normal Vendor/Organization Specific Extension) are defined in VSE.

When MIPv4 signal such as RRQ, RRP, AA or AS stores CVSE, MIPv4 node (HA, FA (Foreign Agent), CMIP terminal, and PMIP client), which does not recognize the corresponding signal, discards it. In the case of NVSE, the MIPv4 node, which does not recognize the signal, neglects the NVSE portion and continues the process.

The present embodiment uses NVSE to perform MIPv4 process correctly even in the node, not supporting the present invention, but CVSE may be used.

FIG. 2 shows a format of NVSE. That expansion can be stored into any expanded portion of MIPv4. RFC3115 defines "134" as Type. The number of bytes of expanded data, not containing Type and Length, is set to Length. Vendor or an identifier showing organization is set in Vendor/Org-ID. Values indicating vender or type of expansion information defined for each organization are defined in Vendor-NVSE-Type. Values of expansion information indicated with Vendor-NVSE-Type are set in Vendor-NVSE-Value.

FIG. 3 is a block diagram illustrating the configuration of the mobile terminal 3 of FIG. 1. Referring to FIG. 3, the mobile terminal 3 is configured of CMIP operation means 31, Simple IP operation means 32, connection/mobile detection means 33, policy storage means 34, terminal operation request transmission means 35, terminal operation information reception means 36, and operation decision means 37.

The CMIP operation means 31 includes means for realizing the mobility by the terminal function in conformance with MIPv4 defined in RFC3344 or MIPv6 defined in RFC3775. The Simple IP operation means 32 includes means for operating as a general IPv4 or IPv6 terminal.

The connection/mobile detection means 33 has the function of detecting a link-up or connection to a different link by, for example, the function of the layer 2. That means can be realized by a conventional radio interface, which does not include the feature of the present invention. The policy storage means 34 stores policy information regarding a request for CMIP operation or a request for PMIP operation. The policy information may be set by a user or may be set previously to a terminal.

The terminal operation request transmission means 35 includes means of acquiring, when the connection/mobile detection means 33 detects connection to a network or movement, the operation mode of the mobile terminal 3 from the policy information stored in the policy storage means 34 and then transmitting AS (in MIPv4) or RS (in MIPv6), which stores the operation mode information.

When the mobile terminal 3, for example, requires the CMIP operation, it is conceived that information showing a CMIP operation request (for example, a code corresponding to a CMIP operation request) is stored into AS or RS. In the case of PMIP operation, it is conceived that a general AS or RS is transmitted.

Even if the mobile terminal 3, which does not require a CMIP operation request, wants notifying about a terminal having a CMIP function, AS or RS may store a code indicating a preparation of the CMIP function. The present embodiment uses AS (in MIPv4) or RS (in MIPv6) to transmit a terminal operation request but may use other protocols.

The terminal operation information reception means 36 includes means of receiving AA or RA transmitted from the PMIP client (A)13 or (B)14 or GW 15 and then acquiring information (such as HoA or HA address) necessary for the operation in the operation mode of the mobile terminal 3 stored and determined by the PMIP client or in the decided operation mode.

The operation mode may be judged indirectly based on information necessary for the decided operation mode, without being directly stored into AA or RA. The present embodiment uses AA (in MIPv4) or RA (in MIPv6) to receive terminal operation information but may use other protocols.

If the operation mode, determined by the PMIP client captured in AA or RA, is a CMIP operation, the operation decision means 37 has the function of validating the CMIP operation means 31. In the case of PMIP operation, the operation decision means 37 has the function of invalidating the CMIP operation means 31 and validating the Simple IP operation means 32 operating as a Simple IP terminal. In either case, the operation decision means 37 has the function of setting information necessary for each operation acquired by AA or RA.

The mobile terminal 3 has authentication processing means (not shown). The authentication processing means includes means of performing an authentication process with the PMIP client when connection to a network is detected. At this time, the mobile terminal 3 stores identifiers, such as NAI (Network Access Identifier), defined in RFC4282, into an authentication request.

Figure 4:
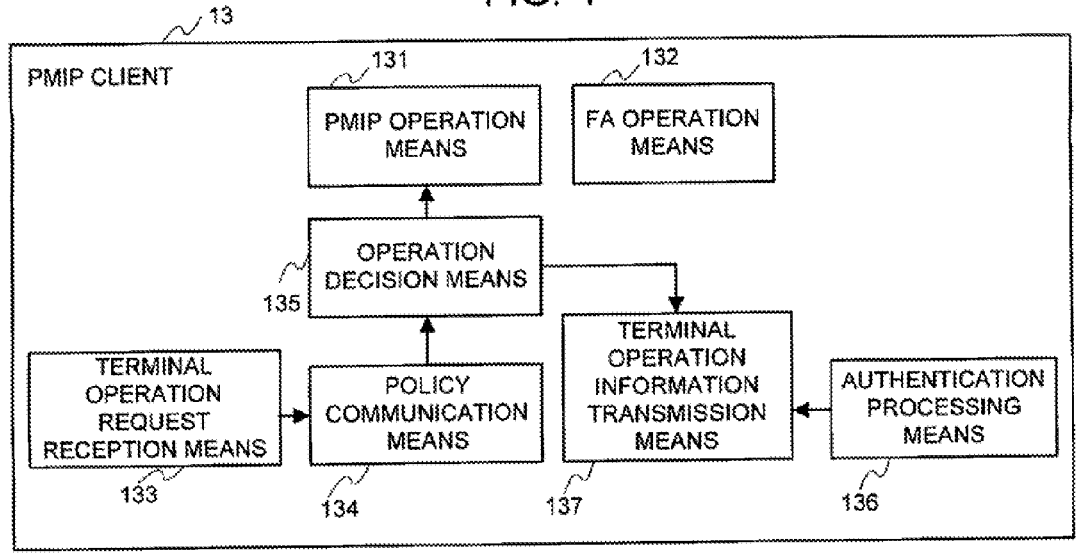
FIG. 4 is a block diagram illustrating the configuration of the PMIP client A(13) shown in FIG. 1.

FIG. 4 is a block diagram illustrating the configuration of the PMIP client (A)13 shown in FIG. 1. Referring to FIG. 4, the PMIP client (A)13 includes PMIP operation means 131, FA operation means 132, terminal operation request reception means 133, policy communication means 134, operation decision means 135, authentication processing means 136, and terminal operation information transmission means 137. The PMIP client (b)14 (not shown) is similar to the PMIP client (A)13 in the configuration and operation thereof.

The PMIP operation means 131 includes means of operating as the general PMIP client, described in the function of non-patent documents 2 to 4. However, the PMIP client (A)13, in place of the mobile terminal 3, transmits RRQ (in MIPv4) or BU (in MIPv6) to the HA 11, in response to notification transmitted from the operation decision means 135.

In the case of MIPv4, the FA operation means 132 has the function of operating as FA defined in RFC3344. FA function is used on the occasion when the CMIP operation of the mobile terminal 3 is permitted and on the occasion when the mobile terminal 3 is operated in the FA mode. However, as the mobile terminal 3 operates in the FA mode, the PMIP operation means 131 may have the configuration of transmitting RRQ to HA 11 via FA. In the case of MIPv6, the operation means is not required.

The terminal operation request reception means 133 has the function of receiving AS (in the case of MIPv4) or RS (in the case of MIPv6), transmitted from the mobile terminal 3, acquiring operation request information of the mobile terminal 3 stored in AS or RS, and transmitting the corresponding information to the operation decision means 135. In the present embodiment, the terminal may use AS (in the case of MIPv4) or RS (in the case of MIPv6) as terminal operation request transmission means but other protocols may be used alternatively.

The policy communication means 134 has the function of storing the identifier of the mobile terminal 3 connected to the policy storage server 12 into a policy request, transmitting the policy request, and, as a result, acquiring policy information regarding a CMIP operation or PMIP operation of the mobile terminal 3, from the policy storage server 12. The information to be transmitted to the policy storage server 12 may contain other information such as the capability of the mobile terminal 3 (with or without the CMIP terminal), except the identifier of the PMIP client (A)13 or the identifier of the mobile terminal 3.

When the information contains the PMIP client identifier, the policy storage server 12 can return the policy depending on specifying a specific PMIP client or an access network in which a mobile terminal exists, in addition to specifying a specific mobile terminal. Moreover, the PMIP identifier can be used to authenticate PMIP. NAI can be used as the identifier of a mobile terminal or PMIP.

The operation decision means 135 has the function of deciding the operation mode regarding a PMIP operation or CMIP operation of the mobile terminal 3, based on policy information captured by the policy communication means 134 and based on operation request information of the terminal captured from the terminal operation request (AS(RS)) reception means 133. The specific operation deciding procedure will be explained later below (refer to FIG. 6).

For the CMIP operation of the mobile terminal 3 in MIPv4, it is further decided to select the FA mode or CCoA mode, in which the mobile terminal 3 operates. With the PMIP client, for example, having the function of FA, the policy can decide the FA mode. If the PMIP client does not have the FA function, the policy can decide the CCoA mode. However, even when the PMIP client has the FA function, the CCoA mode may be selected. In such a case, by acquiring the policy regarding a selection of a FA mode or CCoA mode from the policy storage server 12, the configuration is considered that decides an operation to be selected.

The authentication processing means 136 has the function of communicating with the authentication server 16, using an identifier transmitted from the mobile terminal 3, and acquiring, from the authentication server 16, information regarding HoA (merely corresponding to an IP address in the case of the CMIP terminal or the Simple IP terminal) of the terminal and the address of the HA 11. The function of the authentication processing means 136 is equivalent to the function described as Authenticator in non-patent document 1. The configuration including a Radius server or a Diameter server is broadly used as the authentication server 16.

The terminal operation information transmission means 137 has means of storing the operation mode of the mobile terminal 3 decided by the operation decision means 135 and necessary information, such as an address, needed in the decided operation mode, into AA or RA, and transmitting them to the mobile terminal 3. Information captured by the authentication processing means 136 is used as necessary information such as address. In the present embodiment, AA (in the case of MIPv4) or RA (MIPv6) is used for means by which the PMIP client transmits terminal operation information, but other protocols may be used.

Figure 5:
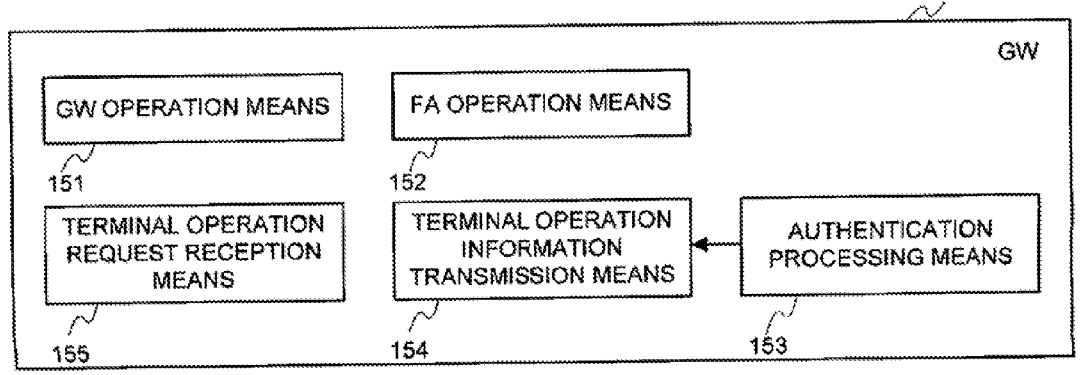
FIG. 5 is a block diagram illustrating the configuration of GW shown in FIG. 1.

FIG. 5 is a block diagram illustrating the configuration of GW 15 shown in FIG. 1. Referring to FIG. 5, the GW 15 includes GW operation means 151, FA operation means 152, terminal operation request reception means 155, authentication processing means 153, and terminal operation information transmission means 154.

The GW operation means 151 has the function that operates as a general router. The GW operation means 151 may include means of establishing secure communications between the mobile terminal 3 and the GW operation means 151, according to IPsec (defined in RFC4301). In each case, the GW operation means 151 do not include elements characterized by the present invention. In the case of MIPv4, the FA operation means 152 has the function for operating as FA defined in RFC3344. The FA function is used when the mobile terminal 3 is operated in the FA mode. In the case of MIPv6, the FA operation means 152 is not required.

The terminal operation request reception means 155 receives AS (in the case of MIPv4) or RS (in the case of MIPv6), transmitted from the mobile terminal 3, and acquires operation request information of the mobile terminal 3 stored in RS or AS. However, since the terminal operation request reception means 155 does not include the PMIP operation means, "CMIP operation" is decided automatically. In the present embodiment, the terminal uses AS (in the case of MIPv4) or RS (MIPv6) as terminal-operation-request transmission means, but other protocols may be used.

The authentication processing means 153 has the function of communicating with the authentication server 16, using the identifier transmitted from the mobile terminal 3, and acquiring, from the authentication server 16, information regarding HoA (merely corresponding to an IP address, in the case of the CMIP terminal and the Simple IP terminal) of the terminal and HA address. The authentication processing means 153 is equivalent to the authenticator, described in the non-patent document 1, in function. The configuration using a Radius server or Diameter server is broadly used as the authentication server 16.

The terminal operation information transmission means 154 has the function of transmitting, to the mobile terminal 3, AA or RA which stores an operation mode "CMIP" in which the mobile terminal 3 operates and information (information such as HoA or HA address) related to the mobile terminal 3 captured by the authentication processing means 153, that is, information necessary for the mobile terminal 3 operating as the CMIP terminal. When the mobile terminal 3 is MIPv4, the terminal operation information transmission means 154 decides whether or not the mobile terminal 3 operates in a FA mode or a CCoA mode. As to the policy for the decision, for example, the FA mode can be decided for the GW 15 with FA function as FA. The CCoA mode can be decided for the GW 15 without FA function.

When the GW 15 has the FA function, providing means for communicating with the policy storage server 12 may allow acquiring the policy for the FA mode or the CCoA mode from the policy storage server 12 and thus deciding a desired operation. In the present embodiment, the GW 15 uses AA (in the case of MIPv4) or RA (in the case of MIPv6) as means for transmitting terminal operation information but other protocols may be used.

Figure 6:
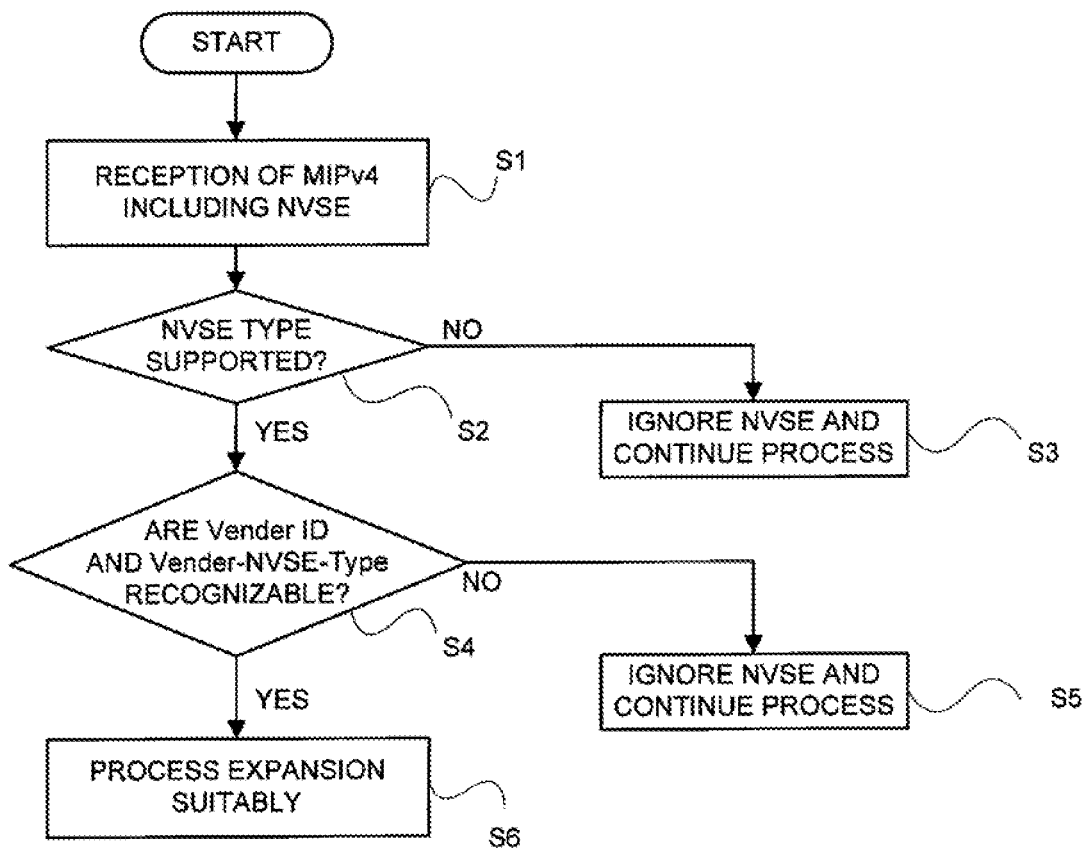
FIG. 6 is a flowchart showing a MIPv4 node in which NVSE according to a first embodiment of the present invention receives a MIPv4 signal stored.

FIG. 6 is a flowchart showing the process of a MIPv4 node that receives the MIPv4 signal storing NVSE of the first embodiment. Referring to FIG. 6, the process in the MIPv4 node that has received the MIPv4 signal in which NVSE is stored will be explained below.

When receiving the MIPv4 signal (step S1 in FIG. 6), the MIPv4 node decides whether or not the MIPv4 node supports NVSE Type (step S2 in FIG. 6). When the MIPv4 node does not support NVSE Type, the MIPv4 node neglects NVSE. The process is carried out continuously as if the MIPv4 signal does not have NVSE (step S3 in FIG. 6).

When supporting NVSE type, the MIPv4 node decides whether or not Vendor/Org-ID and Vendor-NVSE-Type can be recognized next (step S4 in FIG. 6). When Vendor/Org-ID or Vendor-NVSE-Type cannot be recognized, the MIPv4 node neglects the NVSE. As if the NVSE does not exist, the process continues (step S5 in FIG. 6). Moreover when Vendor/Org-ID and Vendor-NVSE-Type are recognizable in the decision of the step S4, the MIPv4 node processes the NVSE suitably (step S6 in FIG. 6).

By using NVSE, the node, not recognizing the expansion, neglects the expansion and thus can continue the process of the signal storing the expansion. In MIPv4, the terminal operation request information, the terminal operation control information, and the IP setting information are transmitted, with application of NVSE.

In the case of MIPv6, RA stores the operation control information and the IP setting information of the mobile terminal. However, by storing expansion information as an option of RA, the node recognizing the expansion information can be directed to perform information processing while other nodes can be directed to neglect the information.

That is, that case allows conducting in a manner to similar to that in the case of using NVSE of the MIPv4. Accordingly, in MIPv6, it is assumed that information, such as the terminal operation request information, the terminal operation control information or the IP setting information, is transmitted using an option of RA.

Here, it is considered that the mobile terminal 3 supports MIPv4 and the HA 11 is HA of MIPv4 and the PMIP client (A)13 or PMIP client (B)14 is PMIPv4. Moreover, it is considered that other nodes in FIG. 1 corresponds to IPv4.

In the present embodiment, the PMIP client (A)13, which are installed on the boundary of the network 100 and the access network (A)200, has the authentication client function of the access network (A)200. The PMIP client (A)13 may have the FA function. In assumption, the PMIP client A(13), which does not have the FA function, has the function receiving and transmitting AS and AA of FA.

FIG. 7 is a sequence chart showing an operation when the mobile terminal 3 performs a PMIP operation in accordance with the policy of a network in the first embodiment. FIG. 8 is a flowchart showing the procedure of determining the operation of the mobile terminal 3, in accordance with a request from the mobile terminal 3 and a network policy, in the first embodiment of the present invention.

FIG. 9 is a sequence chart showing the operation when the CMIP operation is permitted in accordance with the policy of a network, with the mobile terminal 3 connected to the access network (A)200, in the first embodiment of the present invention. FIG. 10 is a sequence chart showing the operation when the mobile terminal 3 is connected to the access network (C)400, in the first embodiment of the present invention.

With the mobile terminal 3 with a MIPv4 function connected to the access network (A)200, the PMIP operation according to the policy of a network will be first explained by referring to FIG. 1 and FIG. 7.

With the mobile terminal 3 connected to the access network (A)200, an access authentication process begins between the mobile terminal 3 and the PMIP client (A)13. The mobile terminal 3 transmits an user identifier for user identification to the PMIP client (A)13, together with secret information for authentication.

The PMIP client (A)13 inquires the authentication server 16 of authentication information received from the mobile terminal 3 and thus decides whether or not the mobile terminal 3 is an access authorized user. When it is decided that the mobile terminal 3 is an access authorized user, the PMIP client (A)13 down-loads HoA to be allocated to the mobile terminal 3 from the authentication server 16 (when the mobile terminal 3 performs a PMIP operation, the mobile terminal 3 regards HoA as a mere address) and HA address to be an anchor (a1 in FIG. 7). Other information, such as key information for position registration to HA, may be down-loaded except the above-mentioned information.

Next, when the access authentication is successful in the step a1, the mobile terminal 3 transmits AS to Solicitation Address (224.0.0.2), Mobile-Agents multicast group address (224.0.0.11) or Address (255.255.255.255), defined in RFC1256 (a2 in FIG. 7).

When the mobile terminal 3 includes a CMIP and wants an operation as CMIP, information regarding a CMIP request can be stored into AS. When the mobile terminal 3 wants to notify the PMIP client of the intention of a CMIP request, without sending information regarding the CMIP request, the method may be used of defining a correspondence relation between a PMIP request and a CMIP request to a destination address, such as a desire for a PMIP operation upon transmission of AS to Address (224.0.0.2) or a desire for a CMIP operation upon transmission of AS to Address (234.0.0.11).

When the mobile terminal 3 does not want a CMIP operation, information regarding a undesired CMIP operation may be stored into AS or may be merely handled as AS. When the mobile terminal 3 notifies the network, related to the mobile terminal 3 which does not want a CMIP operation, of the presence of the CMIP function, the former method is chosen.

Next, the PMIP client (A)13 transmits a policy request to the policy storage server 12 (a3 in FIG. 7). When the policy storage server 12 stores PMIP clients or policy information in user units, the policy storage server 12 can transmit the identifier of a PMIP client and a user identifier captured in the step a1 and can require the PMIP client or user individual policy information. Placing step a3 behind the step a2 is not essential.

When the policy storage sever 12 receives a policy request in the step a3, the policy storage user 12 notifies the PMIP client (A)13 of a predetermined policy. When the policy request includes a PMIP client identifier and a user identifier, the policy storage user 12 retrieves the policy corresponding to them and returns the retrieved results to the PMIP client (A)13 (a4 in FIG. 7). In that operational example, the policy saying "PMIP compulsion" responds to the PMIP client (A)13.

The PMIP client (A)13 decides the operation of the mobile terminal 3, in accordance with the request operation information obtained in the step a2 and the network policy obtained in the step a4 (a5 in FIG. 7). The procedure of determining the operation of the mobile terminal 3 will be described later. However, since the response saying "PMIP compulsion" is received in the step a4, the operation required by the mobile terminal 3 is determined as PMIP.

The PMIP client (A)13 transmits HoA of the mobile terminal 3 captured in the step a1 and RRQ acting as its own address, CoA, to the HA address captured in the step a1 (a6 in FIG. 7).

The HA 11 creates Binding Cache for transferring an encapsulated packet (created through encapsulation of packets to HoA), to an address of the PMIP client (A)13, in accordance with RRQ transmitted from the PMIP client (A)13 in the step a6. Thereafter, in response to RRQ, the HA 11 transmits RRP to the PMIP client (A)13 (a7 in FIG. 7).

When receiving RRP, the PMIP client (A)13 prepares to de-capsulate encapsulated packets transmitted from the HA 11 while prepares to encapsulate packets (that is, packets of HoA as a transmission source), transmitted from the mobile terminal 3, and to transfer the resultant encapsulated packets to the HA 11.

After receiving RRP in the step a7, the PMIP client (A)13 transmits AA to the mobile terminal 3 (a8 in FIG. 7). Using NVSE, AA stores information "PMIP" representing an operation as PMIP and stores, on this occasion, HoA to be used as an address of the mobile terminal 3 and default GW address.

Moreover, by setting a "H" flag of AA to "1" and storing the HA address in the CoA field, the PMIP client can be set to the PMIP operation mode even when the CMIP terminal, not supporting the present invention, receives the corresponding AA. However, at this moment, since both HA and HoA are in a non-setting state and a return to Home cannot be detected, the procedure of dynamically allocating HA defined in RFC4433 is processed. By doing so, Home return is detected at the time HoA has been captured. Thereafter, as the PMIP operation (an operation as a Simple IP terminal) can be established.

As described above, even the operation of the mobile terminal, which does not support the present invention, can be controlled so as to perform the PMIP operation. However, such a mobile terminal has a disadvantage in terms of the number of signals and time, compared with the mobile terminal 3 supporting the present invention.

When receiving AA in the step a8, the mobile terminal 3 determines to perform the PMIP operation in accordance with "PMIP" information stored in AA. Moreover, the mobile terminal 3 completes the IP setting, in accordance with HoA and default GW address information stored in AA (a9 in FIG. 7). After the address setting has completed in the step a9, communications can be established between the mobile terminal 3 and the CN 2 (a10 in FIG. 7).

The procedure of determining the operation of the mobile terminal 3 according to a request from the mobile terminal 3 and a network policy in the step a3 will be explained by referring to FIG. 8.

First, the PMIP client (A)13 decides whether or not the PMIP function of its own node is valid (step S11 in FIG. 8). If the PMIP function operates validly, the PMIP client (A)13 decides whether or not the network policy captured in the step a4 in FIG. 7 is "PMIP compulsion" (step S12 in FIG. 18). When the network policy is "PMIP compulsion", the PMIP client (A)13 decides that the operation of the mobile terminal 3 corresponds to "PMIP" (step S13 in FIG. 8).

When the network policy does not correspond to "PMIP compulsion", the PMIP client (A)13 decides whether or not the network policy is "CMIP permission" (step S14 in FIG. 8). When the network policy is "CMIP permission", the PMIP client (A)13 decides whether or not the operation request of the mobile terminal 3 captured in the step a1 in FIG. 7 corresponds to "CMIP operation request" (step S15 in FIG. 8).

When the CMIP request operation is not indicated expressly, like "PMIP operation request" or, for example, mere AS received in the step a1 of FIG. 7, the PMIP client (A)13 decides the operation of the mobile terminal 3 is "PMIP" (step S13 in FIG. 8).

When "CMIP operation request" is shown, the PMIP client (A)13 decides the "CMIP" operation of the mobile terminal 3 (step S16 in FIG. 8). When the network policy is not "CMIP permission" in the step S14, the PMIP client (A)13 decides the "CMIP" operation of the mobile terminal 3 (step S16 in FIG. 8).

In the operational example, the PMIP client (A)13 provides basically "YES" (PMIP function validated) as the decision result in the step S11. However, when some reason causes losing the PMIP function of the PMIP client (A)13 or the PMIP client does not has the PMIP function, as shown in GW 15, the operation of the mobile terminal 3 is decided to be "CMIP" because the decision result in the step S11 is "NO" (PMIP function invalidity).

Next, the operation in which the CMIP operation is permitted according to the network policy, with the mobile terminal 3, which has the MIPv4 function, connected to the access network (A)200, will be explained later by referring to FIG. 9.

Step b1 to step b4 in FIG. 9 are similar to step a1 to step a4 for PMIP compulsion shown in FIG. 7. However, the policy responded from the policy storage server 12 in the step b4 corresponds to "CMIP permission".

Next, the PMIP client (A)13 decides the "CMIP operation" of the mobile terminal 3 according to the procedure of deciding the operation of the mobile terminal 3 explained with FIG. 8 (b5 in FIG. 9). When the "CMIP operation" of the mobile terminal 3 is decided in the step b5, the PMIP client (A)13 does not transmit RRQ to HA, different from the case of "PMIP compulsion", but transmits AA to the mobile terminal 3 (b6 in FIG. 9).

Using NVSE, AA stores information "CMIP" indicating that the mobile terminal 3 has to be operated as CMIP and information regarding in which of HoA, CoA and FA mode and CCoA (Colocated-CoA), necessary to operate as CMIP, the mobile terminal 3 has to be operated. Information regarding in which of the FA mode and CCoA the mobile terminal 3 has to be operated may be captured from the policy storage server 12.

Moreover, "H" flag of AA is set to "1" and the HA address is stored into CoA field. When the CMIP terminal, not supporting the present invention, receives the AA, through the above-mentioned setting, the PMIP operation is chosen. In that case, by the time when the PMIP operation enables communications, more signals and much time are taken.

When AA is received in the step b6, the mobile terminal 3 decides a CMIP operation in accordance with "CMIP" information stored in AA. Moreover, the mobile terminal 3 performs the IP setting in accordance with HoA and CoA stored in AA and decides an operation in a FA mode or in a CCoA mode, based on FA/CCoA information (b7 in FIG. 9). An operation in FA mode is considered in the example shown in FIG. 9.

After deciding an operation in the CMIP or FA mode in the step b7, the mobile terminal 3 transmits RRQ to the PMIP client (A)13 to register HoA and CoA in the HA 11. The PMIP client (A)13 transfers RRQ from the mobile terminal 3 to the HA 11 (in this case, the PMIP client (A)13 performs an operation corresponding to FA) (b8 in FIG. 9).

When receiving RRQ in the step b8, the HA 11 encapsulates packets for HoA, thus creating Binding cache for transferring to the address of the PMIP client (A)13. Thereafter, the HA 11 transmits RRP, as a response to RRQ, to the PMIP client (A)13.

When receiving RRP from the HA 11, the PMIP client (A)13 prepares to decapsulate encapsulated packets transmitted from the HA 11. Moreover, the PMIP client (A)13 encapsulate packets (that is, packets of HoA, or a transmission source) transmitted from the mobile terminal 3 and prepares to transfer the encapsulated packet to the HA 11, thus finally transferring RRP to the mobile terminal 3 (b9 in FIG. 9). In the step b9, after the position registration to the HA 11 has been completed, communications between the mobile terminal 3 and CN 2 can be established (b10 in FIG. 9).

Next, the operation where the mobile terminal 3 is connected to the access network (C)400 will be explained by referring to FIG. 1 and FIG. 10. In FIG. 10, the step c1 and the step c2 are similar to the step a1 and the step a2 in PMIP compulsion, shown in FIG. 7.

When it receiving AS in the step c2, the GW 15, which does not have a PMIP client function, decides the "CMIP" operation of mobile terminal 3, regardless of the presence or absence of a request of the CMIP operation (c3 in FIG. 10).

Next, the GW 15 transmits AA to the mobile terminal 3 (c4 in FIG. 10). AA stores information "CMIP" representing the mobile terminal 3 to be operated as CMIP, using NVSE and information regarding in which of HoA, CoA and FA modes and CCoA (Colocated-CoA), necessary to operate as CMIP, the mobile terminal 3 has to be operated.

For example, when GW 15 has the FA function, the FA mode may be selected. When GW 15 does not have the FA function, the CCoA mode may be selected. Here, the case where CCoA is selected is considered. Moreover, when the FA mode is selected, "F" flag of AA is set to "1". A GW address (that is, a FA address) is stored in the CoA field.

When the CCoA mode is selected, the "F" flag and "R" flag of AA are set to "1". The address with accessibility, allocated from the HA 11 to the network under GW, is stored in the CoA field. Even when the CMIP terminal, not supporting the present invention, receives AA in accordance with the setting, an operation in the FA mode or operation in the CCoA mode can be established. In either case, the process of acquiring HoA is required later. In the operation in the CCoA mode, the CMIP terminal, not supporting the present invention, must further set the HA address previously or must acquire the address of HA in some way.

When receiving AA in the step c5, the mobile terminal 3 decides performing a CMIP operation in the CCoA mode, based on "CMIP" information stored in AA and information representing an operation in the CCoA mode. Moreover, the mobile terminal 3 performs the IP setting in accordance with HoA and CoA, stored in AA and acquires and holds the HA address stored in AA.

The mobile terminal 3 transmits RRQ for corresponding to HoA and CoA set in the step c5, to the HA address captured in the step c5 (c6 in FIG. 10).

When receiving RRQ in the step c6, the HA 11 creates Binding Cache that encapsulates packets for HoA and transfers the encapsulated packets to CoA of the mobile terminal 3. Thereafter, the HA 11 transmits RRP, as a response to RRQ, to the mobile terminal 3. When receiving RRP, the mobile terminal 3 prepares to decapsulate encapsulated packets transmitted from the HA 11 (c7 in FIG. 10). Preparation is made for encapsulating packets to be transmitted by the mobile terminal 3 and transmitting the encapsulated packets to the HA 11. After a position registration to the HA 11 in the step c7 has completed, communications between the mobile terminal 3 and CN 2 can be established (c8 in FIG. 10).

Next, let us consider the condition of hand-over of the mobile terminal 3. First, like a hands-over from the access network (A)200 to the access network (B)300, the case is considered where the mobile terminal 3 performs hand-over to an access network supporting PMIP.

The operation of the above case may be similar to that of the case where the mobile terminal 3 is connected to the access network (A)200 in FIG. 7 or FIG. 9. In such a case, the PMIP client in FIG. 7 or FIG. 9 becomes the PMIP client (B)14. However, the system may be used, of capturing, from the PMIP client (A)13, or a hand-over source, information (such as key information for securely performing position registration to HoA, HA-address, and HA), necessary to transmit RRQ by the PMIP client or the mobile terminal 3, without inquiring the authentication server 16, when the mobile terminal 3 is connected to the access network (B)300.

At this time, BS (Base Station) positioned in the access network can notify of a specific PMIP client, which is a hand-over source. Alternatively, ASN Functional Entity, shown in non-patent document 1, may be utilized. However, since the specific method is not directly related to the present invention, the detailed explanation is omitted here.

In the case of hand-over, the mobile terminal 3 has HoA already acquired. HoA is an address held during continuous communications. In the step a8 or in the step b6, HoA may be omitted from among information included in AA.

Next, let us consider that the mobile terminal 3 performs a hand-over to the access network, not supported by PMIP, like hand-over from the access network (B)300 to the access network (C)400.

The above operation may be similar to the operation of the mobile terminal 3 connected to the access network (C)400 in FIG. 10. However, the system may be used, of capturing, from the PMIP client (B)14, or a hand-over source, information (such as key information for securely performing position registration to HoA, HA address, and HA), necessary to transmit RRQ by the mobile terminal 3, without inquiring the authentication server 16, when the mobile terminal 3 is connected to the access network (C)400. In the hand-over, since the mobile terminal 3 already has HoA, which is an address held during continuous communications, HoA may be omitted from among information included in AA in the step c4.

In the present embodiment, AS and AA are utilized to exchange information among the mobile terminal 3, the PMIP clients (A)13 and (B)14, and GW 15. However, the present embodiment does not require only AS and AA, but, for example, may use IPCP (Internet Protocol Control Protocol) configure-request, IPCP configure-Ack.

In assumption, the mobile terminal 3, which supports transmission of AS containing expanded information and interpretation of AA containing the expanded information, shown in the present embodiment, has the CMIP function. That reason lies in that it is realistically difficult to assume that the Simple IP terminal operates differently from a general IP terminal. However, Simple IP terminal may be the mobile terminal 3 of the present invention.

In the present embodiment, it is considered that the mobile terminal 3 transmits a request for operating with CMIP. However, if the policy is that the mobile terminal 3 certainly operates with PMIP when the mobile terminal 3 is connected to an access network which can deliver the PMIP function, AS transmitted by the mobile terminal 3 may be a general AS, which does not contain the expanded element of the present invention. In such a case, an inquiry to the policy storage server 12 can be omitted.

Moreover, in the present embodiment, the DNS server address is not contained as IP information to be sent to the mobile terminal 3 in accordance with AA. However, the IP information may contain the DNS server address.

In the present embodiment as described above, the PMIP client or the GW 15 notifies the mobile terminal of information for controlling the operation of the mobile terminal 3 with the CMIP function. Thus, the PMIP or CMIP operation of the mobile terminal 3 can be decided rapidly in accordance with a network administrator's policy.

Moreover, according to the present embodiment, the PMIP client or GW 15 simultaneously notifies the mobile terminal 3 of the IP setting information necessary for each operation, together with information about control of the operation of the mobile terminal 3. Thus, IP setting can be completed at the same time when the operation of the mobile terminal 3 is determined, so that its high-speed communication state can be brought.

Moreover, the mobile terminal 3 can notify the network 100 of information desiring the PMIP or CMIP operation and the network 100 can control the operation of the mobile terminal 3 in view of a desired operation of the mobile terminal 3 and the policy of the network 100

When the mobile terminal 3 requires the CMIP operation, it may select HA, as an anchor, different for each service, according to the intention of the mobile terminal 3. When the mobile terminal 3 is provided with plural communication I/F (Interface), it may perform hand-over to a different I/F, with the timing intended by a terminal user, not at the moment when the mobile terminal 3 has been connected to the access network.

Moreover, in the present embodiment, storing information for controlling the operation of the mobile terminal 3 and information for requiring the MIP operation or CMIP operation into general protocol signals (AS and AA in MIPv4) eliminates separately sending general signals and signals for transmitting information of the present invention. This feature allows an effective utilization of the communication band to be realized.

Moreover, in the present embodiment, the information, which can control even the operation of a general CMIP terminal, not supporting the present invention, is stored into the basic information portion (different from the expanded information portion in the present invention) of a general signal. By doing so, the operation of the CMIP terminal, not supporting the present invention, can be controlled.

Accordingly, the PMIP client of the present invention can accommodate effectively a CMIP terminal supporting the present invention, a CMIP terminal not supporting the present invention, and a Simple IP terminal. Thus, the PMIP client can be easily applied to the existing system or the system under consideration now.

FIG. 11 is a sequence chart illustrating the operation of a mobile terminal management system according to a second embodiment of the present invention. FIG. 12 is a sequence chart illustrating a CMIP operation authorized by the network policy, with the mobile terminal 3 connected to the access network (A)200, according to the second embodiment of the present invention. FIG. 13 is a sequence chart illustrating the operation of the mobile terminal 3 connected to the access network (C)400, according to the second embodiment of the present invention.

The configuration of a mobile terminal management system according to the second embodiment of the present invention is similar to that of the first embodiment of the present invention shown in FIG. 1. However, in the second embodiment of the present invention, the mobile terminal 3 supports MIPv6 and the HA 11 is HA of MIPv6 and the PMIP clients (A)13 and (B)14 are PMIPv6, respectively. Other nodes in FIG. 1 correspond to IPv6.

In the present embodiment, the PMIP client (A)13, disposed on the boundary between the network 100 and the access network (A)200, supposedly has authentication client function of the access network (A)200. First, the PMIP operation of the mobile terminal 3, connected to the access network (A)200, in accordance with the network policy, will be explained below by referring to FIG. 1 and FIG. 11.

FIG. 11 illustrates the operation where the mobile terminal 3 is forced to implement a PMIP operation. However, the process between the step d1 and the step d10 corresponds to the process between the step a1 and the step a10 in FIG. 7, that is, the same operation is performed substantially. However, RS and RA, different from AS and AA, are used in the step d2 and the step d8. Information to be stored in RA is different from that in FIG. 7.

BU (Binding Update) in the step d6 and BA (Binding Acknowledge) in the step d7 are different from RRQ and RRP in FIG. 7, respectively. Even so, those functions are identical in terms of requiring the HA 11 to hold information including the correspondence between HoA and CoA and to transfer encapsulated packets for HoA to CoA.

MIPv6 does not use AS and AA but uses RS and RA for a detection of movement and a decision of CoA. Accordingly, in the present embodiment, information is stored in an option of RS and an option of RA. When the information is stored into options of RS and RA, the node, which cannot recognize that information, and neglects the corresponding option. Thus, RS and RA can be used in a manner to that of NVSE in MIPv4.

In the step d8 shown in FIG. 8, RA stores information "PMIP" for designating the PMIP operation to the option. The basic information portion of RA stores Home prefix for creating HoA by the mobile terminal 3 and Linklayer address of I/F which has transmitted RA of a PMIP client.

By storing information about Home prefix into the basic portion, even the mobile terminal 3, which does not corresponds to terminal control information of the present invention, can perform a PMIP operation. In this case, the mobile terminal 3 requires the step of discovering HA using Dynamic Home Agent Address Discovery, described in RFC3775, or using a method set previously, and further capturing HoA. After the step, the mobile terminal 3 can finally detect Home return at the time when HoA has captured and thus the PMIP operation can be first executed.

As described above, the number of signals and time, exchanged with a network, become larger, compared with the mobile terminal compatible with terminal control information of the present invention.

In the step d9 of FIG. 11, the mobile terminal 3 decides the PMIP operation in accordance with the "PMIP" notification in the step d8. At this time, the mobile terminal 3 creates an address, based on Home prefix and I/F identifier (for example, MAC (Media Access Control) address), captured in the step d8, and determines it as its own address.

Moreover, the mobile terminal 3 sets a transmission source address of RA, as a default GW address, further acquires a Linklayer address of the RA transmission source of the PMIP client, and stores the captured address in one-to-one correspondence with the transmission source address of RA (the address of a PMIP client). That process enables eliminating the signal exchange for capturing Linklayer address through a ND (Neighbor Discovery) protocol process when a packet is first sent to a default GW, so that the efficiency is improved. RA may not include the Linklayer address but RA may include the DNS server address.

The mobile terminal 3 decides the PMIP operation in the step d9. After the necessary IP address setting has completed, the mobile terminal 3 can initiate communications with the CN 2 (d10 in FIG. 11).

Next, the operation, in the case where the mobile terminal 3 is connected to the access network (A)200 and the network policy authorizes the CMIP operation, will be explained below by referring to FIG. 1 and FIG. 12.

The process between the step e1 and the step e3 in FIG. 12 is similar to the process between the step d1 and the step d3 in FIG. 11. In the step e4, different from the step d4 in FIG. 11, the policy storage server 12 issues "CMIP permission".

In the step e5, the operation of the mobile terminal 3 is determined in accordance with "CMIP request" transmitted from the mobile terminal 3 in the step e2, information on "CMIP permission" acknowledged in the step e4, and the PMIP/CMIP operation decision procedure shown in FIG. 8. As a result, the "CMIP operation" is selected.

In the step e6, RA is transmitted to the mobile terminal 3. RA stores, into an option portion, "CMIP" information for designating the operation in CMIP, and HA address and Foreign prefix, necessary for the CMIP operation of the mobile terminal 3. The basic information portion of RA stores Home prefix for creating HoA by the mobile terminal 3 and Linklayer address of I/F which has transmitted RA of the PMIP client. In that case, as described above, the mobile terminal, which cannot recognize the terminal control information of the present invention, performs the PMIP operation.

The CMIP operation of the mobile terminal 3 is decided in accordance with the "CMIP" information of RA received in the step e6 (e7 in FIG. 12). Moreover, the mobile terminal 3 creates HoA and CoA based on Home prefix and Foreign prefix, stored in RA, respectively. Moreover, the mobile terminal 3 allocates HoA and CoA to itself and then transmits BU to register a correspondence between HoA and CoA to the HA address stored in RA (e8 in FIG. 12). The mobile terminal 3 receives BA in response to BU (e9 in FIG. 12) and then can initiate communications to the CN 2 (e10 in FIG. 12).

Next, the operation of the mobile terminal 3 connected to the access network (C)400 will be explained below by referring to FIG. 1 and FIG. 13. The steps f1 and f2 in FIG. 13 are similar to the steps d1 and d2 in FIG. 11, respectively.

The GW 15, not having the PMIP client function, decides the CMIP operation of the mobile terminal 3, regardless of the presence or absence of a request for CMIP operation, when receiving RS in the step f2 (f3 in FIG. 13). Then, the GW 15 transmits RA to the mobile terminal 3 (f4 in FIG. 13). RA stores, into an option portion, "CMIP" information for designating the operation of CMIP, an HA address necessary for the CMIP operation of the mobile terminal 3, and Home prefix used for creation of HoA by the mobile terminal 3. The basic information portion of RA stores Foreign prefix for creation of CoA by the mobile terminal 3 and the Linklayer address of the I/F, which has transmitted RA of a PMIP client.

In that case, the mobile terminal, which cannot recognize terminal control information of the present invention, performs a CMIP operation. However, the mobile terminal 3 requires the step of discovering HA using Dynamic Home Agent Address Discovery, described in RFC3775, or using the method of presetting, and further the step of acquiring HoA.

The mobile terminal 3 decides the CMIP operation in accordance with "CMIP" information of RA received in the step f4 (f5 in FIG. 13). Moreover, the mobile terminal 3 creates HoA and CoA from Home prefix and Foreign prefix, stored in RA, respectively. After allocating HoA and CoA to its own, the mobile terminal 3 transmits BU to register HoA-to-CoA correspondences to the HA address stored in RA (f6 in FIG. 13). The mobile terminal 3 receives BA in response to BU (f7 in FIG. 13) and then can initiate communications to CN2 (f8 in FIG. 13).

Next, the mobile terminal 3 considers the hand-over conditions. First, the case is considered where the mobile terminal 3 implements hand-over to the access network supporting the PMIP as the mobile terminal 3 implements hand-over from the access network (A)200 to the access network (B)300.

Such an operation can be applicable to the mobile terminal 3 connected to the access network (A)200 in FIG. 11 and FIG. 12. In that case, the PMIP client in FIG. 11 and FIG. 12 corresponds to the PMIP client (B)14. However, with the mobile terminal 3 connected to the access network (B)300, the system of acquiring information (such as key information for securely executing the position registration to HoA, HA address, and HA), necessary to transmit BU by the PMIP client or the mobile terminal 3, form the PMIP client (A)13, or a hand-over source, without inquiring the authentication server 16.

In that case, the BS (Base Station) deployed in the access network can notify whether or not what is the PMIP client of the hand-over source. Alternatively, ASN Functional Entity, described in non-patent document 1, can be utilized. However, the detail of the specific method will be omitted here because there is no direct relation with the present invention.

In the case of hand-over, the mobile terminal 3, which has HoA already captured, or the address held continuously during communications, Home prefix may be omitted among from information including RA in the step d8 of FIG. 11.

Next, let us now consider that the mobile terminal 3 implements the hand-over to the access network, not being supported by the PMIP, as the mobile terminal 3 implements hand-over from the access network (B)300 to the access network (C)400.

The operation in that case may be identical to that of the mobile terminal 3 connected to the access network (C)400 in FIG. 13. However, with the mobile terminal 3 connected to the access network (C)400, the system of acquiring information (such as key information for securely executing BU to Home prefix, HA address, and HA), necessary to transmit BU by the mobile terminal 3, from the PMIP client (B)14 of the hand-over source, without inquiring the authentication server 16.

In the case of the hand-over, the mobile terminal 3, which has HoA already captured, or the address held continuously during communications, Home prefix may be omitted among from information including RA in the step f4 of FIG. 13.

In the present embodiment, RS and RA are utilized to exchange information among the mobile terminal 3 and the PMIP client (A)13, the PMIP client (B)14 and the GW 15. However, IPCPv6 configure-request, and IPCPv6 configure-Ack, for example, can be utilized in place of RS and RA.

In the present embodiment, it is assumed that the mobile terminal 3, which supports transmission of RS including expanded information and interpretation of RA including expanded information, has the CMIP function. That reason results from that it is difficult to premise that the Simple IP terminal operates differently from general IP terminals. However, the Simple IP terminal may has the function of the mobile terminal 3 according to the present invention.

Moreover, the present invention considers the case where the mobile terminal 3 transmits a request for CMIP operation. However, with, for example, the policy always implementing the PMIP operation when the mobile terminal 3 is connected to the access network, which can issue the PMIP function, RS transmitted from the mobile terminal 3 may be handled as a general RS, not including expanded element in the present invention. In that case, inquiring the policy storage server 12 can be omitted.

In the present embodiment, RA does not include the DNS (Domain Name System) server address as IP information notifying the mobile terminal 3. However, the RA may include the DNS server address.

In the present embodiment, by storing operation request information and operation control information of the mobile terminal 3 into RS and RA, respectively, even the mobile terminal 3, provided with MIPv6, can decide PMIP and CMIP operations at high speed and can perform the IP setting for each operation.

Like the mobile oriented network designed in 3GPP ($3^{rd}$ Generation Partnership Project) or 3GPP2, or WiMAX Forum, the present invention is effective in the environment where the PMIP terminal and the CMIP terminal co-exist.

Differences in names of PMIP client or mobility anchor or function arrangements, except the mobility function, or the like, depend on standard-setting organizations. However, the mobility function, which uses MIPv4 or MIPv6 protocol, is applicable to the present invention. The standard-setting organizations are studying the network accommodating several ten million terminals. A very important problem is that such a network makes it possible provide a promotion of efficiency of signal exchange or a rapid service at the time of network connection or hand-over. The present invention can solve and reduce such a problem.

The invention claimed is:

1. A mobile terminal operation control method comprising:
   transmitting, by a mobile terminal supporting MIPv6 (Mobile Internet Protocol version 6), a router solicitation to a network device, the router solicitation including a notification of a CMIP (Client Mobile Internet Protocol) function capability of the mobile terminal;

deciding, by said network device associated with a network, a PMIP (Proxy Mobile Internet Protocol) operation or a CMIP operation of said mobile terminal based on the received router solicitation and at least one of a policy of said network and the presence or absence of said PMIP function in said network device;

storing, by said network device, the decided operation in an option of a router advertisement;

storing, by said network device, information about Home prefix that is used to create HoA (Home Address) in a basic portion of the router advertisement; and transmitting, by said network device, the router advertisement to said mobile terminal, wherein the router solicitation is transmitted to either a first destination address or a second destination address of the network device, and wherein transmission to the first destination address indicates a request to use said CMIP function of said mobile terminal, and transmission to the second destination address indicates a request to use a PMIP function of said mobile terminal.

2. The mobile terminal operation control method of claim 1, wherein said network device transmits setting information necessary to execute said decided operation, to said mobile terminal, and wherein said mobile terminal performs the setting necessary for said decided operation based on said setting information transmitted.

3. The mobile terminal operation control method of claim 1, wherein the decided operation is stored into an expanded portion of the router advertisement, and wherein said method further comprises neglecting, by the mobile terminal, the decided operation if the mobile terminal cannot interpret the expanded portion.

4. The mobile terminal operation control method of claim 1, wherein said network device is any one of 3GPP-A (3GPP-Anchor), MME (Mobility Management Entity)/UPE (User Plane Entity), PDG (Packet Data Gateway), PDSN (Packet Data Serving Node), PDIF (Packet Data Interworking Function), and ASN (Access Service Network)-GW (GateWay).

5. A mobile terminal management system, comprising:
a network device associated with a network; and
a mobile terminal supporting MIPv6 (Mobile Internet Protocol version 6) configured to transmit a router solicitation to said network device, the router solicitation including a notification of a CMIP (Client Mobile Internet Protocol) function capability of the mobile terminal, wherein the router solicitation is transmitted to either a first destination address or a second destination address of the network device, wherein transmission to the first destination address indicates a request to use said CMIP function of said mobile terminal, and transmission to the second destination address indicates a request to use a PMIP (Proxy Mobile Internet Protocol) function of said mobile terminal, and wherein said network device is configured to:
decide a PMIP operation or a CMIP operation of said mobile terminal based on the router solicitation from said mobile terminal and at least one of a policy of said network and the presence or absence of said PMIP function in said network device,
store the decided operation in an option of a router advertisement,
store information about Home prefix that is used to create HoA (Home Address) in a basic portion of the router advertisement, and
transmit the router advertisement to said mobile terminal.

6. The mobile terminal management system of claim 5, wherein said network device transmits setting information necessary to execute said decided operation to said mobile terminal, and wherein said mobile terminal performs the setting for execution of said decided operation in accordance with said setting information transmitted.

7. The mobile terminal management system of claim 5, wherein:
the decided operation is stored into an expanded portion of the router advertisement, and
the mobile terminal neglects the decided operation if it cannot interpret the expanded portion.

8. The mobile terminal management system of claim 6, wherein said network device comprises any one of 3GPP-A (3GPP-Anchor), MME (Mobility Management Entity)/UPE (User Plane Entity), PDG (Packet Data Gateway), PDSN (Packet Data Serving Node), PDIF (Packet Data Interworking Function), and ASN (Access Service Network)-GW (GateWay).

9. A network device associated with a network and in communication with a mobile terminal supporting MIPv6 (Mobile Internet Protocol version 6), the network device comprising:
at least one hardware processor; and
a memory storing instructions,
wherein the at least one hardware processor is programmed to execute the instructions to:
decide a PMIP (Proxy Mobile Internet Protocol) operation or a CMIP (Client Mobile Internet Protocol) operation of said mobile terminal based on a router solicitation received from the mobile terminal, and at least one of a policy of said network and the presence or absence of said PMIP function in said network device,
store the decided operation in an option of a router advertisement,
store information about Home prefix that is used to create HoA (Home Address) in a basic portion of the router advertisement, and
transmit the router advertisement to said mobile terminal, wherein the router solicitation includes a notification of a CMIP function capability of said mobile terminal, wherein the router solicitation is transmitted to either a first destination address or a second destination address of the network device, and wherein transmission to the first destination address indicates a request to use said CMIP function of said mobile terminal, and transmission to the second destination address indicates a request to use a PMIP function of said mobile terminal.

10. The network device of claim 9, wherein the at least one hardware processor is further programmed to transmit to said mobile terminal setting information to execute said decided operation.

11. The network device of claim 9, wherein:
the at least one hardware processor is further programmed to store the decided operation into an expanded portion of the router advertisement, and
the mobile terminal neglects the decided operation if it cannot interpret the expanded portion.

12. The network device of claim 10, wherein said network device is any one of 3GPP-A (3GPP-Anchor), MME (Mobility Management Entity)/UPE (User Plane Entity), PDG (Packet Data Gateway), PDSN (Packet Data Serving Node), PDIF (Packet Data Interworking Function), and ASN (Access Service Network)-GW (GateWay).

\* \* \* \* \*